US010579926B2

(12) United States Patent
Yedidia et al.

(10) Patent No.: US 10,579,926 B2
(45) Date of Patent: Mar. 3, 2020

(54) METHOD AND DEVICE FOR MULTI-AGENT PATH PLANNING

(71) Applicant: Disney Enterprises, Inc., Burbank, CA (US)

(72) Inventors: Jonathan S. Yedidia, Burbank, CA (US); Jose Bento, Burbank, CA (US); Nate Derbinsky, Burbank, CA (US); Charles Mathy, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 923 days.

(21) Appl. No.: 14/976,412

(22) Filed: Dec. 21, 2015

(65) Prior Publication Data

US 2017/0176994 A1  Jun. 22, 2017

(51) Int. Cl.
 *G06N 5/02* (2006.01)
 *G06N 7/00* (2006.01)
 *G06F 17/11* (2006.01)

(52) U.S. Cl.
 CPC .............. *G06N 5/02* (2013.01); *G06F 17/11* (2013.01); *G06N 7/005* (2013.01)

(58) Field of Classification Search
 None
 See application file for complete search history.

(56) References Cited

U.S. PATENT DOCUMENTS

| 8,879,811 | B2 | 11/2014 | Liu et al. | |
| 9,639,813 | B2* | 5/2017 | Yedidia | G06Q 10/04 |
| 2010/0256852 | A1 | 10/2010 | Mudalige | |
| 2015/0330209 | A1 | 11/2015 | Panchal et al. | |
| 2016/0217380 | A1* | 7/2016 | Yedidia | G06N 5/04 |

OTHER PUBLICATIONS

Mosabbeb et al., Multi-View Human Activity Recognition in Distributed Camera Sensor Networks, Sensors, 13, pp. 8750-8770 (Year : 2013).*

(Continued)

*Primary Examiner* — Alan Chen
(74) *Attorney, Agent, or Firm* — Fay Kaplun & Marcin, LLP (57) ABSTRACT

A method and device determines an optimization solution for an optimization problem. The method includes receiving the optimization problem having cost functions and variables where the cost functions have a relationship with the variables and receiving a landmark indicating a point that an agent is to visit while moving, a cost being associated with ignoring the landmark. The method includes generating a first message for the cost functions for the corresponding variable based upon the relationship and a second message for each of the variables for the corresponding cost function based upon the relationship. The method includes generating a disagreement variable for each corresponding pair of variables and cost functions measuring a disagreement value between the first and second beliefs. The method includes repeating steps (c), (d), and (e) until a consensus is formed between the first and second messages until the optimization solution is determined based upon the consensus.

18 Claims, 5 Drawing Sheets

(56) References Cited

OTHER PUBLICATIONS

Wang et al., Solving Multiple-Block Separable Convex Minimization Problems Using Two-Block Alternating Direction Method of Multipliers, Mathematics of Computation, pp. 1-29 (Year: 2013).*
Zhou et al., 3D Shape Estimation from 2D Landmarks: A Convex Relaxation Approach, The IEEE Conference on Computer Vision and Pattern Recognition (CVPR), 2015, pp. 4447-4455 (Year: 2015).*
Boyd et al., ("Distributed Optimization and Statistical Learning via the Alternating Direction Method of Multipliers", FTML, vol. 3. No. 1(2010), pp. 1-122.
Martins et al., "An Augmented Lagrangian Approach to Constrained Map Inference", ICML, 2011, pp. 8.
Alonso-Mora et al., "Reciprocal Collision Avoidance for Multiple Car-like Robots", IEE ICRA, 2012, pp. 360-366.
Derbinsky et al., "An Improved Three-Weight Message-Passing Algorithm", ArXiv:1305.1961(2013).
Bento et al., "A message-passing algorithm for multi-agent trajectory planning", Advances in Neural Information Processing Systems (NIPS) (2013).
Mathy et al., "Sparta: Fast global planning of collision-avoiding robot trajectories", NIPS Workshop on Learning, Inference, and Control of Multi-Agent Systems, (2015).

* cited by examiner

METHOD AND DEVICE FOR MULTI-AGENT PATH PLANNING

BACKGROUND INFORMATION

An optimization algorithm may be used to determine a solution for a problem in which the solution considers all variables and constraints related to the problem and provides a lowest cost configuration of the values for all the variables. For example, in a televised event, a plurality of cameras may be used to capture the event. The cameras may move along planned trajectories to fully capture the event. Accordingly, the problem associated with such a scenario may be to determine the planned trajectories for the cameras that incorporate the variables and constraints associated therewith. Such variables and constraints may include no overlap of space as the cameras cannot physically be co-located at a common time, a trajectory path that provides a sufficient video capture of the event, a tracking algorithm for the occurrences during the event, etc. Through incorporation of all these considerations, the optimization algorithm may determine the trajectories of the cameras to provide the lowest cost solution (e.g., least distance to be covered by the cameras, best coverage of the event, least energy requirements, etc.). However, most optimization algorithms require significantly high processing requirements for all these considerations to be assessed as well as provide the lowest cost solution to the problem.

A conventional algorithm used for convex optimization is the Alternating Direction Method of Multipliers (ADMM). Conventionally, the ADMM algorithm is a variant of an augmented Lagrangian scheme that uses partial updates for dual variables. This algorithm has also been utilized and shown to be well-suited for distributed implementations. Further developments in using the ADMM algorithm have included being used in applications such as Linear Programming (LP) decoding of error-correcting codes and compressed sensing. However, the ADMM algorithm has in practice been used exclusively for convex optimization problems whereas determining optimal trajectories is not convex. Another conventional approach for optimization uses graphical models in which a graph denotes conditional dependencies between random variables. The graphical models often are combined with a Belief Propagation (BP) message-passing algorithm in which inferences are performed on the graphical models. The BP message-passing algorithm calculates the marginal distribution for each unobserved node, conditional on any observed nodes within the graphical model.

Even with altering the above conventional approaches to fit the optimization problem of determining trajectories, a further consideration in determining optimal trajectories involves the number of dimensions in which the objects may move. For example, the cameras may be limited to a surface upon which the camera is placed upon such as mounted on a land vehicle, placed on rails or tracks, etc. That is, this may represent a two-dimensional path restriction as they are limited to move along this plane. In another example, the cameras may be free to move in any direction which may represent a three-dimensional path availability such as aerial movements (e.g., mounted on an unmanned aerial vehicle) or underwater movements (e.g., mounted on an autonomous underwater vehicle). Therefore, even if the ADMM and/or BP algorithms are altered for use in the less complex two-dimensional analysis of determining optimal trajectories, the applicability of these altered algorithms will have limited applicability to the three-dimensional analysis.

DETAILED DESCRIPTION

The exemplary embodiments relate to a device and method for planning trajectories for multiple agents. The exemplary embodiments may be further understood with reference to the following description and the appended drawings, wherein like elements are referred to with the same reference numerals. The exemplary embodiments describe a method and device for generating an optimization solution. Specifically, the method and device utilize a message-passing version of the ADMM algorithm that is applicable to determining trajectories that may travel within a three-dimensional space. The message-passing algorithm includes a weighting system in which a message passed between nodes of a graphical model may include weights associated with confidence values of the messages. The optimization solution, the generation thereof, the message-passing algorithm, the ADMM algorithm, the confidence weighting system, and a related method will be described in further detail below.

The exemplary embodiments provide a mechanism for planning collision-free paths for multiple agents using optimization methods. Specifically, the exemplary embodiments utilize proximal algorithms in the mechanism. As will become evident below, the proximal algorithms used with the exemplary embodiments provide parallelization and decentralization such that the speed with which the algorithms may generate good quality solutions is improved and its ability to incorporate different proximal operators is more efficient. The proximal operators may ensure that paths satisfy a desired property that may be initial constraints that are applied to the problem. Through updates and modifications to the proximal operators through the exemplary embodiments, they may be applied to paths beyond two-dimensions and allow for intermediate waypoints to be independent of agents instead of being preassigned to specific agents. The new proximal operators according to the exemplary embodiments may deal with agents moving in arbitrary dimensions that more efficiently compute and further features such as landmarks may be introduced which are space-time positions that are automatically assigned to the set of agents under different optimality criteria.

Initially, the formulation of path planning may be described as an optimization problem. As an optimization problem, the incorporation of the proximal algorithms according to the exemplary embodiments is hereby introduced. For example, a system may have p spherical agents in $R^d$ of radius $\{r_i\}_{i=1}^p$. Accordingly, the objective is to find collision free paths $\{x_i(t)\}_{i\in[p],t\in[0,T]}$ for all agents between a respective specified initial position $(x_i^{init})_{i=1}^P$ at time 0 and specified final position $\{x_i^{final}\}_{i=1}^P$ at time T. In a simplest case, the total time from 0 to T may be divided into intervals of equal length and the path $\{x_i(t)\}_{t=0}^T$ of agent $i\in[p]$ is parametrized by a set of break points $\{x_i(s)\}_{s=0}^{\eta}$ such that $x_i(t)=x_i(s)$ for $t=sT/\eta$ and all s. It is noted that between break points, agents may be assumed to have zero-acceleration.

In this manner, a global path planning may be expressed as an optimization problem with an objective function that is a large sum of simple cost functions. Each function may account for a different aspect of the problem. Using the above notion, the following may be solved for the problem:

$$\text{minimize} \sum_i f^{pos}(x_i(0), x_i^{init}) + \sum_i f^{pos}(x_i(\eta), x_i^{final}) + \quad \text{(Equation 1)}$$
$$\sum_{i>j,s} f_{i,j}^{coll}(x_i(s), x_i(s+1), x_j(s), x_j(s+1)) +$$
$$\sum_{i,s} f_i^{vel}(x_i(s), x_i(s+1)) +$$
$$\sum_{i,s} f_i^{dir}(x_i(s), x_i(s+1), x_i(s+2)) +$$
$$\sum_{W,i,s} f_W^{wall}(x_i(s), x_i(s+1))$$

The function $f^{coll}$ prevents agent-agent collisions. That is, the function $f^{coll}$ is zero if $\|\alpha x_i(s)+(1-\alpha)x_i(s+1)-(\alpha x_j(s)+(1-\alpha)x_j(s+1)\| \geq r_i+r_j$ for all $\alpha\in[0,1]$ and infinity otherwise. The function $f^{wall}$ prevents agents from colliding with obstacles (i.e., non-agent objects). That is, the function $f^{wall}$ is zero if $\|\alpha x_i(s)+(1-\alpha)x_i(s+1)-y\| \geq r_i$ for all $\alpha\in[0,1], y\in W$ and is infinity otherwise. W is a set of points defining an obstacle. W may be a line between two points $x_L$ and $x_R$ in a plane and a summation $\Sigma_W$ is across a set of obstacles. The functions $f^{vel}$ and $f^{dir}$ may impose restrictions on the velocities and direction changes of the paths, respectively. The function $f^{pos}$ may impose boundary conditions. That is, the function $f^{pos}$ is zero if $x_i(0)=x_i^{init}$ (or if $x_i(\eta)=x_i^{final}$) and infinity otherwise.

As discussed above, the multi-agent path planning uses proximal algorithms for solving. Furthermore, the multi-agent path planning is formulated as a large non-convex optimization problem. The exemplary embodiments further utilize the Alternating Direction Method of Multipliers (ADMM) and a variant that introduces a Three Weight Algorithm (TWA). Specifically, the exemplary embodiments provide how an ADMM algorithm for a constrained optimization problem may be derived as a specific case of a message-passing version of the ADMM algorithm for convex optimization, particularly when the agents are allowed to move along paths in a three-dimensional space. The message-passing algorithm is improved upon through introduction of the TWA for the messages between nodes of a graphical model with "certain" and "no opinion" weights as well as the standard weight used in the ADMM. The "certain" messages allow the optimization algorithm to implement constraint propagation while the "no opinion" messages speed convergence for some problems by making the optimization algorithm focus only on active constraints. The three-weight version of message-passing in the ADMM further provides greatly improved performance in non-convex problems while retaining the exact performance of ADMM for convex problems. It is noted that the nodes of the graphical model may be equivalent to the proximal operators described above. Thus, the term "node" as related to the graphical model and the term "proximal operator" may be used interchangeably.

The exemplary embodiments overcome the conventional limits of the ADMM algorithm and are used as a well-defined algorithm for general optimization functions and provide a powerful heuristic algorithm even for NP-hard non-convex problems. When the objective function being optimized by the ADMM algorithm consists entirely of "hard" constraints, the ADMM algorithm reduces to a message-passing version of the "Divide and Concur" (DC) constraint satisfaction algorithm which is effective for a very wide variety of non-convex constraint satisfaction problems. Again, the exemplary embodiments are further adapted for application to agents moving in a three-dimensional space.

As will be described in further detail below, the use of the message-passing algorithm between variables and cost functions in the graphical model enables messages to be sent between these nodes until a consensus is reached; that is, until an optimization solution has been generated. Specifically, messages are transmitted from right side nodes representing a first set of consensus functions to left side nodes representing a second set of functions. That is, the left side functions may be the proximal operators. The left side nodes process those messages and compute new messages that are transmitted back from left side nodes to the right side nodes. The right side nodes then use the messages that have come from the left side nodes to compute new messages that are sent to the left side nodes, and the cycle continues. The weights associated with the messages are determined such that the messages have an appropriate impact in the processing of the messages to compute new messages. The weights for the messages have one of three different weights. A "certain" weight indicates that a cost function or variable (i.e., one of the nodes) is certain (e.g., 100% confidence) about a value of a variable and all other opinions should defer thereto; a "no opinion" weight indicates that the node has no opinion about the value (e.g., may be omitted in the considerations for the consensus); and a "standard" weight indicates that the message is weighted equally with all other standard weight messages.

In view of the above discussion of the manner in which the message passing operates, the ADMM and the TWA are iterative algorithms that do not access the objective function directly but indirectly through multiple algorithmic blocks. As used above, these algorithmic blocks may be the nodes of the graphical model or the proximal operators. The blocks may be used one per function-term in the objective. At each iteration, these proximal operators may be applied independently and so both the TWA and the ADMM are easily parallelized. In general, the ADMM and the TWA are not guaranteed to converge for non-convex problems.

In using the TWA version of the message-passing ADMM, the ADMM iteratively updates five kinds of variables living on the edges of a factor graph as used in a graphical model that is composed of function nodes and variable nodes. The factor graph represents the decomposition of the objective function into separate terms. The ADMM is guaranteed to solve convex problems but empirically, the ADMM and the TWA can also find good feasible solutions for large non-convex problems via the modifications described above.

As discussed above with proximal algorithms, the ADMM does not access a function $f$ in the objective directly but rather indirectly through its proximal operator. For example, the proximal operator may be:

$$x \in \underset{x'}{\arg\min} \ f(x') + \frac{\rho}{2}\|x' - n\|^2 \qquad \text{(Equation 2)}$$

In this proximal operator, $\in$ is used instead of $=$ to indicate that, for a non-convex function $f$, the operator may be one-to-many, in which case extra tie-breaking rule needs to be implemented. The proximal operators appear in the steps that update the left side nodes. Thus, the implementation of these proximal operators is emphasized as an inner-loop step in this framework that provides significant information in the determination of the solution to this optimization problem. For example, when $f=f^{vel}$ takes a quadratic (e.g., kinetic energy) form, the operator such as used in Equation 2 has a simple closed-form expression. However, for E(r) or E(r), the operator involves solving a semi-infinite programming (SIP) problem. Those skilled in the art will understand that the SIP problem involves solving a non-trivial problem with an infinite number of constraints and a finite number of variables.

The ADMM according to the exemplary embodiments rely upon two constant parameters of $\rho$ and $\gamma > 0$. Their performance may be improved by using different values of $\rho$. The TWA improves performance further by assigning to each edge two values $\vec{\rho}$ and $\overleftarrow{\rho}$ and dynamically assigning to them values in $\{0, \text{const.}, \infty\}$, where $\vec{\rho}$ represents a direction from a node on the left side (e.g., of the graphical model on a factor graph representation) to another node on the right side and $\overleftarrow{\rho}$ represents an opposite direction. That is, implementing the TWA requires computing proximal operators and specifying outgoing weights $\vec{\rho}$ of each proximal operator. In the TWA, there are also incoming weights $\overleftarrow{\rho}$ which correspond to the $\rho$ that appear in the definition of the proximal operators but having a fixed update scheme. For the collision operator and landmark operator as described in further detail below, a computation of outgoing weights may be used in which if an operator maps a set of input variables $(n_1, n_2, \ldots, n_k)$ to a set of output variables $(x_1, x_2, \ldots, x_k)$, then, if $n_i \neq x_i$, a first setting of $\vec{\rho}_i = 1$ may be used, otherwise $\vec{\rho}_i = 0$ may be used when $n_i = x_i$. That is, if a variable is unchanged by the operators, the outgoing weight associated to it should be zero, otherwise it is 1.

With the above basis of using the variant of the ADMM and utilizing the TWA, the exemplary embodiments further modify this mechanism to provide a set of algorithmic building blocks in the proximal operators to plan paths for a system of multiple independent agents (e.g., robots) that need to move optimally across a set of locations and avoid collisions with obstacles and each other. Such an optimization problem may be crucial in applications involving automated storage, exploration, and surveillance. The paths of the agents also incorporates the volume of the agent itself, thereby the agents may further incorporate a clearance along its path. Even if each agent has a few degrees of freedom since the paths may be within a three-dimensional space, the joint system is complex and this problem has a relatively high degree of difficulty.

There have been limitations in previous attempts of using the variant of the ADMM with the TWA in the optimization problem being addressed by the exemplary embodiments. One limitation is that solving the SIP problem for robots is limited to two-dimensional movements since the problem is interpreted as a mechanics problem which excludes the applications for which the exemplary embodiments specifically relate. Another limitation is that the prior mechanism does not allow robots to automatically select waypoint positions from a set of reference positions. Such a feature may be required when, for example, problems involve robots in formations such as with the unmanned aerial vehicles and autonomous underwater vehicles. Rather, any reference position must be pre-assigned to a specific robot.

The exemplary embodiments address at least these limitations. Thus, in a first feature, the exemplary embodiments may be applied to a SIP problem involved in collision proximal operators that are reduced to solving a single-constraint non-convex problem with a solution that is determined explicitly in arbitrary dimensions, and that also more efficiently determines the solution, even in two dimensions. In a second feature, the exemplary embodiments provide further modified proximal operators that automatically assign agents to a subset of reference positions and penalize non-optimal assignments. These features may allow solutions to be determined for instances of path planning problems involving many agents that may need to move tightly together. Furthermore, these feature may be used for proximal algorithms to solve other SIP problems. That is, it is noted that the application to path planning is only exemplary and the exemplary embodiments may be applied to other optimization problems.

Figure 1:
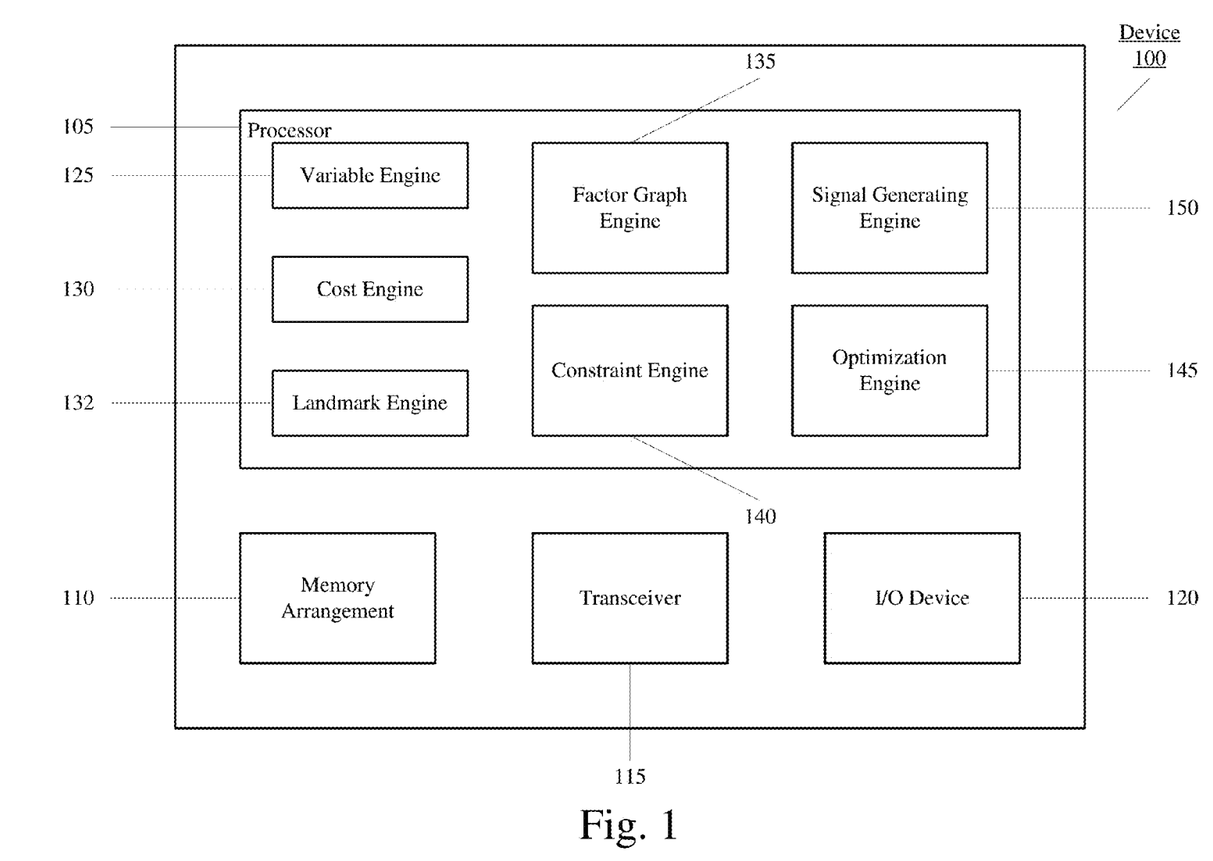
FIG. 1 shows a device for generating an optimization solution according to an exemplary embodiment.

FIG. 1 shows a device 100 for generating an optimization solution according to an exemplary embodiment. The device 100 may be any electronic component that is configured to receive and process data such that the generating is performed. The device 100 may include a processor 105, a memory arrangement 110, a transceiver 115, and an input/output (I/O) device 120. The processor 105 may be configured to execute an optimization application. The memory 110 may store data that is received as well as data that is determined. The transceiver 115 and the I/O device 120 may provide a communicative connection to other electronic devices or users such that data may be received for processing. For example, a user may manually enter constraints involved in a particular optimization scenario or problem.

The processor 105 may further execute a plurality of engines that are configured to perform a functionality associated with generating the optimization solution. As illustrated, the processor 105 may execute a variable engine 125, a cost engine 130, a landmark engine 132, a factor graph engine 135, a constraint engine 140, an optimization engine 145, and a signal generating engine 150. The engines will be described in further detail below.

The optimization functionality executed by the processor 105 utilizes a graphical model in order to generate the optimization solution. When relating to optimization, the graphical model includes a first plurality of cost functions and a second plurality of variables, as well as edges connecting cost functions to variables. The cost functions may represent either "soft" costs or "hard" constraints. An edge exists between a cost function and a variable if the variable is involved in the cost function. In a "soft" cost function, the cost function encodes a preference for the connected variables to have particular values, but that preference may be violated, while in a "hard" constraint version of a cost function, the preferences must not be violated. Each cost function may be connected to one or more of the variables and vice versa.

In view of the manner in which the optimization functionality is utilized, the variable engine 125 may receive the set of variables while the cost engine 130 may receive the set of cost functions. As will be described in further detail below, the landmark engine 132 may receive a set of landmarks which represent a point or group of points in the space that the agent should attempt to visit via its path planning. The factor graph engine 135 may generate the graphical model for the variables and the cost functions. Through the connections between the cost functions and the variables, the constraint engine 140 may provide the lines of the graphical model to the factor graph engine 135. It is again noted that the nodes of the graphical model may be the proximal operators of the exemplary embodiments. All this data may be received by the optimization engine 145 that generates the optimization solution. The signal generating engine 150 may generate a signal based upon the generated optimization solution such that a particular application that requires this solution may receive it. For example, a particular application may be trajectories for a plurality of cameras. The signal generating engine 150 may generate signals for each camera that indicate the trajectory at which the camera is to move.

Figure 2:
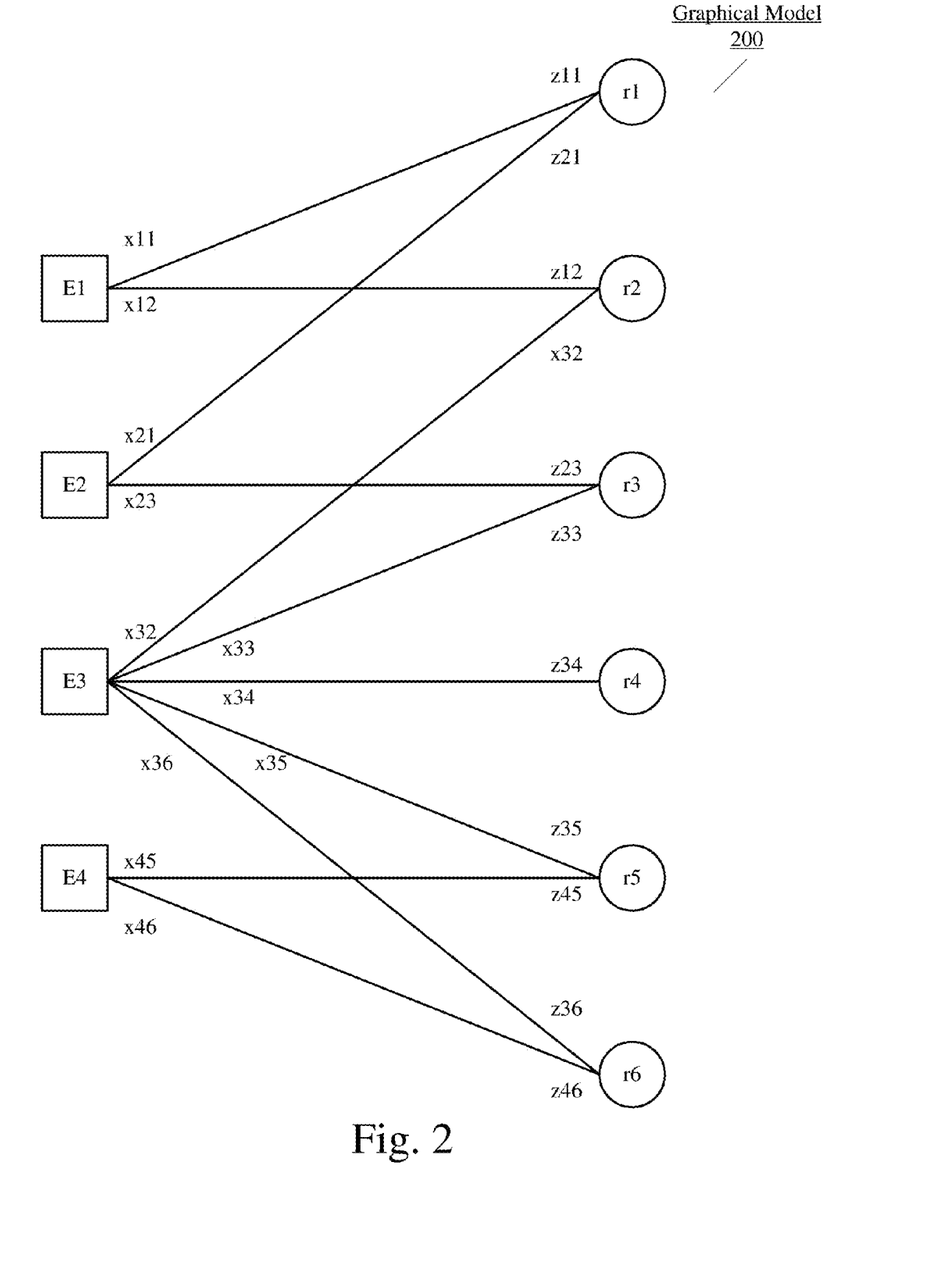
FIG. 2 shows a graphical model according to an exemplary embodiment.

FIG. 2 shows a graphical model 200 according to an exemplary embodiment. Specifically, the graphical model 200 may be the standard "factor graph" for the above described optimization problem. The graphical model 200 includes a set of hard or soft cost functions E1, E2, E3, and E4 as well as a set of variables r1, r2, r3, r4, r5, and r6. When a line connects a cost function node with a variable node, this indicates that the cost function depends upon the corresponding variable. In order to derive the message-passing algorithm for the ADMM algorithm, the problem may be manipulated into a series of equivalent forms before actually minimizing the objective. The first manipulation is a conversion of the problem over the variables $r_j$ into an equivalent problem that depends on variables $x_{ij}$ that sit on the edges of a "normalized" Forney-style factor graph. Again, the blocks of E1-E4 may be the proximal operators. The variables in the standard factor graph are replaced with equality constraints and each of the edge variables is a copy of the corresponding variable that was on its right. Thus, the edge variables attached to the same equality constraint must ultimately equal each other but they may temporarily be unequal while they separately attempt to satisfy different cost functions on the left. The below description uses the notation x to represent a vector consisting of the entire collection of $x_{ij}$ edge variables while the notation z represents a vector consisting of the entire collection of $z_{ij}$ edge variables. It is noted that x normally has a higher dimensionality than r.

As illustrated in FIG. 2, the cost function E1 may be connected to the variables r1 and r2. Thus, the cost function E1 has variables x11 and x12. The cost function E2 may be connected to variables r1 and r3. Thus, the cost function E2 has variables x21 and x23. The cost function E3 may be connected to variables r2, r3, r4, r5, and r6. Thus, the cost function E3 has variables x32, x33, x34, x35, and x36. The cost function E4 may be connected to variables r5 and r6. Thus, the cost function E4 has variables x45 and x46. In this manner, the variable r1 may have variables z11 and z21; the variable r2 may have variables z12 and z32; the variable r3 may have variables z23 and z33; the variable r4 may have variable z34; the variable r5 may have variables z35 and z45; and the variable r6 may have variables z36 and z46. It is noted that the graphical model 200 is only one exemplary embodiment of a graphical model that may represent the interconnections between the cost functions and the variables as well as the ensuing copied variables. It is also noted that the number of nodes on each side of the graphical model 200 is only exemplary as more or fewer nodes may exist on each side.

Due to the bipartite structure of a Forney factor graph such as the graphical model 200, the cost functions may be split into two groups: the nodes on the left may represent the original soft cost functions and hard constraints and the nodes on the right may represent equality constraints. Each edge variable $x_{ij}$ sits on a left side of the edge and a copy may be made denoted as $z_{ij}$ that sits on the right side of the edge. The $x_{ij}$ and $z_{ij}$ variables are referred to as "belief" variables because the $x_{ij}$ variables may intuitively be thought of as "beliefs" that the left-hand side of the factor graph has about the values of the original variables $r_j$, while the $z_{ij}$ variables may be thought of as "beliefs" that the right-hand side of the factor graph has about the values of the original variables $r_j$. The objective function E(x) may then be split into a sum of the left cost functions denoted as $f(x)$ and the right cost functions denoted as g(z), where z is a vector made from all the $z_{ij}$ belief variables.

Figure 3A:
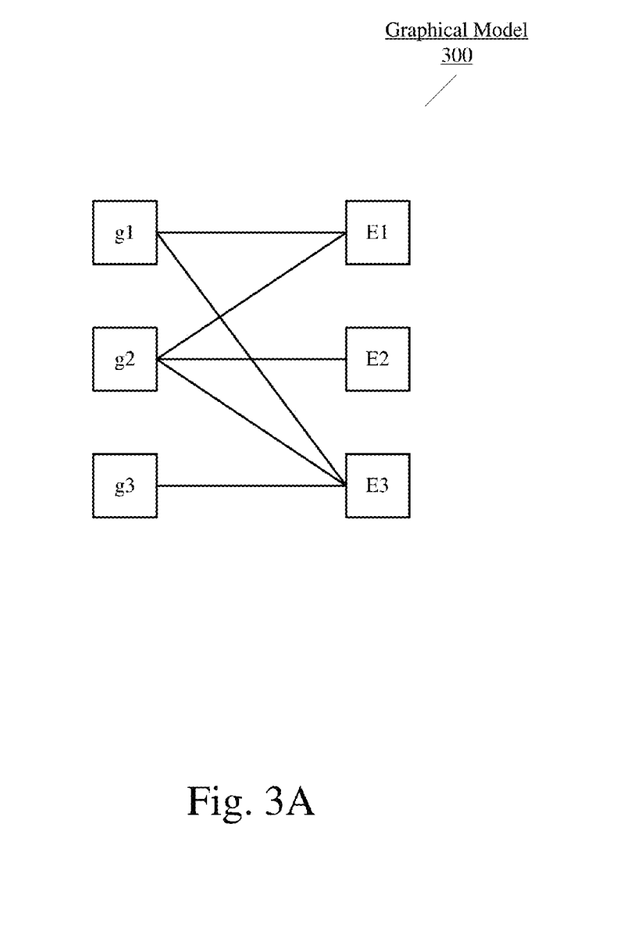
FIG. 3A shows a graphical model as applied to a multi-agent trajectory planning problem according to an exemplary embodiment.
Figure 3B:
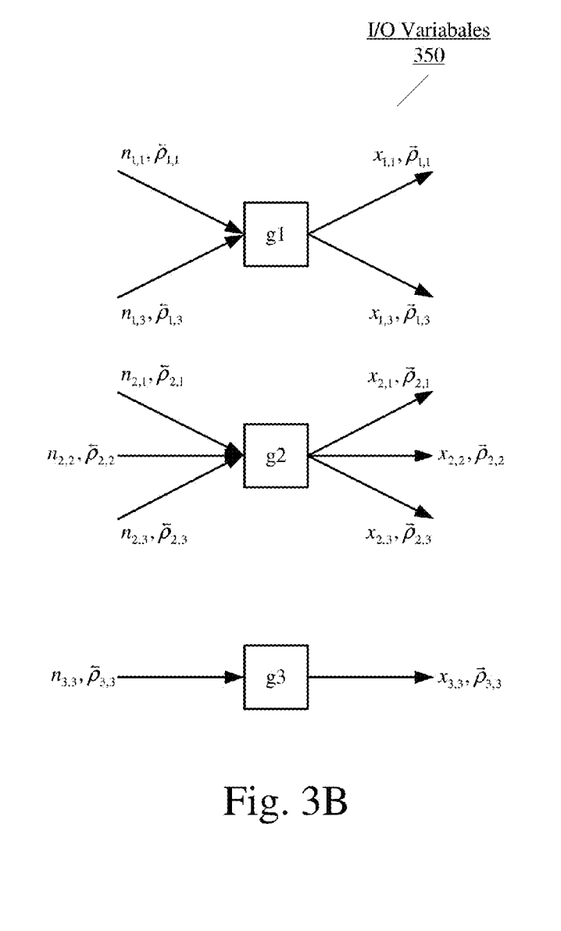
FIG. 3B shows input and output variables for each operator of the graphical model of FIG. 3A according to an exemplary embodiment.

FIG. 3A shows a small part of graphical model 300 as applied to a multi-agent trajectory planning problem according to an exemplary embodiment. FIG. 3B shows input and output variables (I/O) 350 for each minimizer block of the graphical model of FIG. 3A according to an exemplary embodiment. As illustrated, the graphical model 300 may be a bipartite graph with one minimizer-node (g1, g2, and g3) on the left for each function making up the overall objective function and one equality-node (E1, E2, and E3) on the right per variable in the problem. It is noted that most embodiments would typically have many more minimizer nodes on the left and equality nodes on the right (e.g. hundreds of nodes on each side); the exemplary embodiment in FIG. 3A only shows three on each side for illustrative purposes. The I/O variables 350 illustrate the input and output variables for each minimizer block g1, g2, and g3. Specifically, based upon the graphical model 300, the minimizer block g1 includes input variables $n_{1,1}, \overleftarrow{p}_{1,1}$ and $n_{1,3}, \overleftarrow{p}_{1,3}$ with output variables $x_{1,1}, \overrightarrow{\rho}_{1,1}$ and $x_{1,3}, \overrightarrow{\rho}_{1,3}$; the minimizer block g2 includes input variables $n_{2,1}, \overleftarrow{p}_{2,1}, n_{2,2}, \overleftarrow{p}_{2,2}$, and $n_{2,3} \overleftarrow{p}_{2,3}$ with output variables $x_{2,1}, \overrightarrow{\rho}_{2,1}, x_{2,2}, \overrightarrow{\rho}_{2,2}$, and $x_{2,3}, \overrightarrow{\rho}_{2,3}$; and the minimizer block g3 includes input variable $n_{3,3}, \overleftarrow{p}_{3,3}$ with output variable $x_{3,3}, \overrightarrow{\rho}_{3,3}$.

With the graphical models described above and the blocks representing proximal operators, the exemplary embodiments provide no-collision proximal operators to determine solutions for the optimization problem. Specifically, the proximal operator associated with the function $f^{coll}$ may ensure there is no collision between two agents of radius r and r' that move between two consecutive break-points. The variables associated to the two agents and the variables associated to the two break-points may be distinguished. Specifically, a prime (') may be used to distinguish the variables of the agents while an underscore (_) and an opposite underscore (‾) may be used to distinguish the variables of the two break-points, respectively. Accordingly, from Equation 2, the operator may output the following minimizer:

$$\min_{\underline{x}, \underline{x}', \overline{x}, \overline{x}'} \frac{\rho}{2}\|\underline{x} - \underline{n}\|^2 + \frac{\overline{\rho}}{2}\|\overline{x} - \overline{n}\|^2 + \frac{\rho'}{2}\|\underline{x}' - \underline{n}'\|^2 + \frac{\overline{\rho}'}{2}\|\overline{x}' - \overline{n}'\|^2 \quad \text{(Equation 3)}$$

-continued s.t. $\|\alpha(\underline{x}-\underline{x}')+(1-\alpha)(\overline{x}-\overline{x}')\| \geq r+r'$, for all $\alpha \in [0, 1]$ The exemplary embodiments provide an efficient procedure to solve the above Equation 3 SIP problem for agents in arbitrary dimensions by reducing it to a max-min problem. As will be described and explained in further detail below, Equation 3 is essentially equivalent to a "most costly" of the problems of single-constraint problems parameterized by a such as in the following family:

$$\min_{\underline{x},\underline{x}',\overline{x},\overline{x}'} \frac{\rho}{2}\|\underline{x}-\underline{n}\|^2 + \frac{\overline{\rho}}{2}\|\overline{x}-\overline{n}\|^2 + \frac{\rho'}{2}\|\underline{x}'-\underline{n}'\|^2 + \frac{\overline{\rho}'}{2}\|\overline{x}'-\overline{n}'\|^2 \quad \text{(Equation 4)}$$

s.t. $\|\alpha(\underline{x}-\underline{x}')+(1-\alpha)(\overline{x}-\overline{x}')\| \geq r+r'$ It is noted that since Equation 4 has a simple closed-form solution, Question 3 may be solved in an efficient manner for two-dimensional objects, as will be described below. It is also noted that the proximal operator according to the exemplary embodiments may further be utilized for planning in three-dimensions as well as four-dimensions.

With regard to Equation 3 being an equivalent to the "most costly" of the problems, a theorem as described below may be used. Specifically, a theorem may be used where if $\|\alpha(\underline{n}-\underline{n}')+(1-\alpha)(\overline{n}-\overline{n}')\| \neq 0$, then Equation 4 has a unique minimizer, $x^*(\alpha)$. Furthermore, if this condition holds for $\alpha=\alpha^* \in \arg\max_{\alpha' \in [0,1]} h(\alpha')$ where $2h^2(\alpha)$ is the minimum value of Equation 4, then $x^*(\alpha^*)$ is also a minimizer of Equation 3. In addition, if $\|\alpha(\underline{n}-\underline{n}')+(1-\alpha)(\overline{n}-\overline{n}')\| \neq 0$, then the following:

$$h(\alpha) = \max\left\{0, \frac{(r+r') - \|\alpha\Delta\underline{n} + (1-\alpha)\Delta\overline{n}\|}{\sqrt{\alpha^2/\rho + (1-\alpha)^2/\tilde{\rho}}}\right\} \quad \text{(Equation 5)}$$

and the unique minimizer of Equation 4 is:

$$\underline{x}^* = \underline{n} - \gamma\rho(\alpha^2\Delta\underline{n} + \alpha(1-\alpha)\Delta\overline{n}) \quad \text{(Equation 6)}$$

$$\underline{x}'^* = \underline{n}' - \gamma\rho'(\alpha^2\Delta\underline{n} + \alpha(1-\alpha)\Delta\overline{n}) \quad \text{(Equation 7)}$$

$$\overline{x}^* = \overline{n} - \gamma\overline{\rho}((1-\alpha)\alpha\Delta\underline{n} + (1-\alpha)^2\Delta\overline{n}) \quad \text{(Equation 8)}$$

$$\overline{x}'^* = \overline{n}' - \gamma\overline{\rho}'((1-\alpha)\alpha\Delta\underline{n} + (1-\alpha)^2\Delta\overline{n}) \quad \text{(Equation 9)}$$

where $\gamma = \dfrac{2\lambda}{1 + 2\lambda\sqrt{\alpha^2/\rho + (1-\alpha)^2/\tilde{\rho}}}$, $\lambda = -\dfrac{h(\alpha)}{2(r+r')\sqrt{\alpha^2/\rho + (1-\alpha)^2/\tilde{\rho}}}$, $\Delta\underline{n} = \underline{n} - \underline{n}'$, $\Delta\overline{n} = \overline{n} - \overline{n}'$, $\rho = (\underline{\rho}^{-1} + \underline{\rho}'^{-1})^{-1}$, and $\tilde{\rho} = (\overline{\rho}^{-1} + \overline{\rho}'^{-1})^{-1}$.

It is noted that under a few conditions, a Remark may be provided that shows the above theorem may be used to determine a solution to the Equation 3 by solving a simpler Equation 4 for a special value of $\alpha$. However, in numerical implementations, the conditions of the above theorem are easy to satisfy and the $x^*(\alpha^*)$ obtained is the unique minimizer of Equation 3. This principle is described in further detail below.

In other words, to find one solution to Equation 3, $\alpha^*$ may be found by maximizing Equation 5 and then minimizing Equation 4 using Equations 6-9 with $\alpha=\alpha^*$. Both steps may be performed efficiently as will be described below. The intuition behind the above theorem is that if the optimization problem as expressed in Equation 3 is solved for the "worst" constraint (the $\alpha^*$ that produces the largest minimum value), then the solution also satisfies all other constraints. That is, it also holds for all other $\alpha \in [0,1]$. This may be made precise using the following Lemma that is used to prove the above theorem. It is noted that $\partial_i$ is used to denote the derivative of a function with respect to the $i^{th}$ variable. The proof of the Lemma is described below.

The following provides various reasons that illustrate why the above Remark holds true. In a first point, if the various $\rho$ are all positive, the objective function of Equation 3 is strictly convex and the constraint $\|\underline{x},\underline{x}',\overline{x},\overline{x}'\| \leq M$ may be added for M large enough, without changing its minimum value. The new extended set of constraints amounts to the intersection of closed sets with a compact set and by the continuity of the objective function and the extreme value theorem it follows that the problem has a minimizer.

In a second point, the problem expressed in Equation 3 may be interpreted as resolving the following conflict. Specifically, the conflict may be that a first agent wants to move from $\underline{n}$ at a time 0 to $\overline{n}$ at a time 1 and a second agent wants to move from $\underline{n}'$ at a time 0 to $\overline{n}'$ at a time 1. However, if both move in a straight-line, the first and second agents collide into one another. Accordingly, the resolution of the conflict entails how to minimally perturb the initial and final reference positions of the first and second agents so that the collision is avoided. If the vectors $(\underline{n},0)$, $(\underline{n}',0)$, $(\vec{\overline{n}},1)$, $(\overline{n}',1)$ lie in a common three-dimensional plane, there may be ambiguity on how to minimally perturb the initial and final positions of the agents. That is, the reference positions of the first agent may either move up and the second agent down or the reference positions of the first agent may move down and the second agent up (where up and down are relative to the plane defined by the vectors $(\underline{n},0)$, $(\underline{n}',0)$, $(\overline{n},1)$, $(\overline{n}',1)$). However, in numerical implementations, those skilled in the art will understand that the vectors $(\underline{n},0)$, $(\underline{n}',0)$ $(\overline{n},1)$, $(\overline{n}',1)$ rarely lie in the same plane and, in fact, this may be avoided by adding a very small amount of random noise to the plurality of n prior to solving Equation 3.

In a third point, it may be shown from the continuity of the objective function of Equation 3, from the continuous differentiability of $g(x,\alpha) = \|\alpha(\underline{x}-\underline{x}')+(1-\alpha)(\overline{x}-\overline{x}')\|^2 - (r+r')^2$, and from the fact that the level sets of $g(x,\alpha)$ as a function of x never have 'flat' sections, that $h(\alpha)$ is a continuous function. Since $[0,1]$ is compact, it follows that there always exists an $\alpha^*$. Also, for the purpose of a numerical implementation, the expression $\|\alpha^*(\underline{n}-\underline{n}')+(1-\alpha^*)(\overline{n}-\overline{n}')\| \neq 0$ may be considered to hold. In fact, this may be assured by adding a very small amount of random noise to the various n before solving Equation 4. Therefore, for practical purposes, each $\alpha^*$ may be considered to have a unique minimizer to exist to Equation 4. Finally, a careful inspection of Equation 5 shows that if there exists $\alpha$ such that $h(\alpha) > 0$, then $\alpha^*$ is unique and if $h(\alpha) = 0$ for all $\alpha$, then Equations 6-9 always give $x=n$. Accordingly, for the purpose of a numerical implementation, a unique $x^*(\alpha^*)$ is always found and because, in practice, as argued in the two points above, Equation 3 may be considered to have only one solution, it follows that this unique $x^*(\alpha^*)$ is the unique minimizer of Equation 3.

The above referenced Lemma utilizes A as a convex set in $\Re$, the function $g: \Re^d \times A \to \Re, (x,\alpha) \mapsto g(x,\alpha)$ which is convex in $\alpha$ and continuously differentiable in $(x, \alpha)$ and the function $f: \Re^d \to \Re, x \mapsto f(x)$ which is continuously differentiable and has a unique minimizer. For every $\alpha \in A$, $h(\alpha)$ may be denoted the minimum value of $\min_{x:g(x,\alpha) \geq 0} f(x)$ and if the minimum is attained by a feasible point, this may be denoted by $x^*(\alpha)$. Under these conditions, if $\alpha^* \in \arg\max_{\alpha \in A} h(\alpha)$, and if $x^*(\alpha)$ exists around a neighborhood of $\alpha^*$ in A and is differentiable at $\alpha^*$ and if $\partial_1 g(x^*(\alpha^*),\alpha^*) \neq 0$, then $x^*(\alpha^*)$ minimizes to $\min_{x:g(x,\alpha) \geq 0 \forall \alpha \in A} f(x)$.

In showing the proof for the above Lemma, two separate cases may be considered. In a first case, it may be assumed that $x^*(\alpha^*)$ is such that the expression $g(x^*(\alpha^*),\alpha^*)>0$ is true. This implies that $x^*(\alpha^*)$ is a minimizer of $\min_x f(x)$ which implies that $\min_{x:g(x,\alpha^*) \geq 0} f(x) = \min_x f$ which implies that $\min_{x:g(x,\alpha) \geq 0} f(x) \geq \min_x f(x) = \min_{x:g(x,\alpha^*) \geq 0} f(x) = \max_{\alpha' \in A} \min_{x:g(x,\alpha^*) \geq 0} f(x) \geq \min_{x:g(x,\alpha) \geq 0} f(x)$. That is, the expression $\min_{x:g(x,\alpha) \geq 0} f(x) = f(x^*(\alpha^*))$ is true for all $\alpha \in A$. Since $f(x)$ has a unique minimizer, $x^*(\alpha^*)$ must be feasible for the problem $\min_{x:g(x,\alpha) \geq 0} f(x)$ which implies that $g(x^*(\alpha^*),\alpha) \geq 0$ for all $\alpha \in A$. That is, $x^*(\alpha^*)$ is a feasible point of $\min_{x:g(x,\alpha) \geq 0 \forall \alpha \in A} f(x)$ and attains the smallest possible objective value, thereby minimizing it.

In a second case, it may be assumed that $g(x^*(\alpha^*),\alpha^*)=0$. To finish the proof, it suffices to show that $v\partial_2 g(x^*(\alpha^*) \alpha^*) \geq 0$ for all $v \in \Re$ such that $\alpha^* + v \in A$. To illustrate this, it is first noted that, if this is the case, then, for all $\alpha \in A$, convexity implies that $g(x^*(\alpha^*),\alpha) \geq g(x^*(\alpha^*),\alpha^*) + (\alpha - \alpha^*) \partial_2 g(x^*(\alpha^*),\alpha^*) = (\alpha - \alpha^*) \partial_2 g(x^*(\alpha^*),\alpha^*) \geq 0$ which implies that $x^*(\alpha^*)$ is a feasible point for the problem $\min_{x:g(x,\alpha) \geq 0, \forall \alpha \in A} f(x)$. Secondly, it is noted that the following expression holds $f(x^*(\alpha^*)) \geq \min_{x:g(x,\alpha) \geq 0, \forall \alpha \in A} f(x) \geq \max_{\alpha \in A} \min_{x:g(x,\alpha) \geq 0} f(x) = f(x^*(\alpha^*))$. This implies that $x^*(\alpha^*)$ minimizes $\min_{x:g(x,\alpha) \geq 0, \forall \alpha \in A} f(x)$.

Given the above, $v\partial_2 g(x^*(\alpha^*),\alpha^*) \geq 0$ may be shown for all $v \in \Re$ such that $\alpha^* + v \in A$. First, it is noted that since $f$ is differentiable and $x^*(\alpha)$ exists and is differentiable at $x^*(\alpha^*)$, then, by the chain rule, $h(\alpha)$ is differentiable at $\alpha^*$. In addition, it is noted that if $\alpha^*$ maximizes $h$, then if $v \in \Re$ is such that $\alpha^* + v \in A$, the directional derivative of $h$ in the direction of $v$ evaluated at $\alpha^*$ must be non-positive. That is, the expression $v\partial_1 h(\alpha^*) = v\partial_1 f(x^*(\alpha^*))^\dagger \partial_1 x^*(\alpha^*) \leq 0$ holds true. Second, it is noted that in a small neighborhood around $\alpha^*$, the term $x^*(\alpha)$ exists and is continuous (because $x^*(\alpha^*)$ is differentiable) which, by the continuous-differentiability of $g$ and the fact that $\partial_1 g(x^*(\alpha^*),\alpha^* \neq 0)$, implies that $\partial_1 g(x^*(\alpha),\alpha) \neq 0$ in this neighborhood. Therefore, in a small neighborhood around $\alpha^*$, the problem expressed as $\min_{x:g(x,\alpha) \geq 0} f(x)$ has a single inequality constraint and $\partial_1 g(x^*(\alpha),\alpha) \neq 0$ which implies that $x^*(\alpha)$, which is assumed exists in this neighborhood, is a feasible regular point and satisfies the first-order necessary optimality conditions below:

$$\partial_1 f(x^*(\alpha)) + \lambda \partial_1 g(x^*(\alpha),\alpha) = 0 \quad \text{(Equation 10)}$$

$$\lambda g(x^*(\alpha),\alpha) = 0 \quad \text{(Equation 11)}$$

$$g(x^*(\alpha),\alpha) \geq 0 \quad \text{(Equation 12)}$$

$$\lambda \leq 0 \quad \text{(Equation 13)}$$

Subsequently, the directional derivative of Equation 12 may be taken with respect to $\alpha$ in the direction $v$ evaluated at $(x^*(\alpha^*),\alpha^*)$ to obtain:

$$v\partial_1 g(x^*(\alpha^*),\alpha^*)^\dagger \partial_1 x^*(\alpha^*) + v\partial_2 g(x^*(\alpha^*),\alpha^*) \geq 0 \quad \text{(Equation 14)}$$

At the same time, by computing the inner product between Equation 10 and $\partial_1 x^*$ evaluated at $\alpha^*$ and multiplying by $v$, the expression $v\partial_1 f(x^*(\alpha^*))^\dagger \partial_1 x^*(\alpha^*) + \lambda v\partial_1 g(x^*(\alpha^*),\alpha^*)^\dagger \partial_1 x^*(\alpha^*) = 0$ may be obtained. However, since the expression $v\partial_1 f(x^*(\alpha^*))^\dagger \partial_1 x^*(\alpha^*) \leq 0$ has already been proven, the expression $\lambda v\partial_1 g(x^*(\alpha^*),\alpha^*)^\dagger \partial_1 x^*(\alpha^*) \geq 0$ holds true. As noted above, it is again noted that it is being assumed that the expression $g(x^*(\alpha^*),\alpha^*)=0$ is true. Therefore, the expression $\lambda < 0$ is true. It thereby follows that the expression $v\partial_1 g(x^*(\alpha^*),\alpha^*)^\dagger \partial_1 x^*(\alpha^*) \leq 0$ and Equation 14 provides the conclusion that the expression $v\partial_2 g(x^*(\alpha^*),\alpha^*) \geq 0$ is true.

The theorem following Equations 3 and 4 may be proved as follows. The solutions to Equations 3 and 4 remain the same if the portion $\|\alpha(\underline{x}-\underline{x}') + (1-\alpha)(\overline{x}-\overline{x}')\| \geq r+r'$ is replaced by $\|\alpha(\underline{x}-\underline{x}') + (1-\alpha)(\overline{x}-\overline{x}')\|^2 - (r-r')^2 \geq 0$. The proof for the above theorem may be shown with this replacement. Initially, the proof for the above theorem may assume that the Equations 5-9 hold when $\|\alpha(\underline{n}-\underline{n}') + (1-\alpha)(\overline{n}-\overline{n}') \neq 0\|$. This aspect will be shown after the proof of the theorem under this assumption.

The proof for the above theorem may be shown by considering two separate cases. In a first case, the term $r+r' \leq \min_{\alpha \in [0,1]} \|\alpha(\underline{n}-\underline{n}') + (1-\alpha)(\overline{n}-\overline{n}')\|$ may be considered. This implies that the minimum of Equation 3 is 0 and, because the multiple $\rho$ are positive, there is a unique minimizer which equals $(\underline{n},\underline{n}',\overline{n},\overline{n}')$. In this case, $h(\alpha)=0$ is also true for all $\alpha$ which implies that the solution of Equation 4 is $x^*(\alpha)=n$ for all $\alpha$. Therefore, for any optimal $\alpha^*$ for which $\|\alpha^*(\underline{n}-\underline{n}') + (1-\alpha^*)(\overline{n}-\overline{n}')\| \neq 0$, the minimizer of Equation 4 is equal to the unique solution of Equation 3, thereby illustrating the proof for the above theorem.

Next, it may be assumed that $r+r' > \min_{\alpha \in [0,1]} \|\alpha(\underline{n}-\underline{n}') + (1-\alpha)(\overline{n}-\overline{n}')\|$. This implies that there exists an $\alpha$ for which the right hand side of Equation 5 is positive and for which $\|\alpha(\underline{n}-\underline{n}') + (1-\alpha)(\overline{n}-\overline{n}')\| \neq 0$. This further implies that there exists an $\alpha$ for which $h(\alpha)>0$. Therefore, for any optimal $\alpha^*$, the expression $h(\alpha^*)>0$ must be true. If $\|\alpha^*(\underline{n}-\underline{n}') + (1-\alpha^*)(\overline{n}-\overline{n})\| \neq 0$, then Equation 5 holds around a neighborhood of $\alpha^*$ and in this neighborhood, the expression $h(\alpha)>0$ is true. Therefore, in this neighborhood, $x^*(\alpha)$ exists, is unique, and is differentiable. It is noted that the objective function of Equation 3 is continuously differentiable and that the expression $g(x,\alpha) \equiv \|\alpha(\underline{x}-\underline{x}') + (1-\alpha)(\overline{x}-\overline{x}')\|^2 - (r+r')^2$ is continuously differentiable in $(x,\alpha)$ and convex in $\alpha$. If it is true that $\partial_1 g(x^*(\alpha^*),\alpha^*) \neq 0$, then the above described Lemma may be applied with $A=[0,1]$ and it can be concluded that $x^*(\alpha^*)$ is also a solution of Equation 3. Thus, the proof for the above theorem is shown for this case as well.

It may further be shown that in this case, the expression $\partial_1 g(x^*(\alpha^*),\alpha^*) \neq 0$ is true. First, it is noted that the expression $\partial_1 g = (\partial_{\underline{x}} g, \partial_{\overline{x}} g, \partial_{\underline{x}'} g, \partial_{\overline{x}'} g) = 2\|\alpha^*(\underline{x}^*-\underline{x}^{*'}) + (1-\alpha^*)(\overline{x}^* - \overline{x}^{*'})\|(\alpha^*, 1-\alpha^*, -\alpha^*, -1+\alpha^*)$ is true. As discussed above, it is again noted that if $\|\alpha^*(\underline{n}-\underline{n}') + (1-\alpha^*)(\overline{n}-\overline{n}')\| \neq 0$, then $h(\alpha^*)>0$. Therefore, it may be concluded that the expression $r+r' = \|\alpha^*(\underline{x}^*-\underline{x}^{*'}) + (1-\alpha^*)(\overline{x}^*-\overline{x}^{*'}))\|$ is true because otherwise the expression $\|\alpha^*(\underline{x}^*-\underline{x}^{*'}) + (1-\alpha^*)(\overline{x}^*-\overline{x}^{*'})\| < r+r'$ implies that the constraint of the problem expressed in Equation 4 for $\alpha = \alpha^*$ is inactive, thereby implying that the solution must be $x=n$ with objective value 0 which contradicts the fact that $h(\alpha^*)>0$. Hence, the expression $\partial_1 g = (r+r')(\alpha^*, 1-\alpha^*, -\alpha^*, -1+\alpha^*)$ is always non-zero is true and that proves that the above theorem is true in this case as well.

As discussed above, Equations 5-9 are shown to hold when $\|\alpha(\underline{n}-\underline{n}') + (1-\alpha)(\overline{n}-\overline{n}') \neq 0\|$. The following provides the proof for this statement. Initially, the problem expressed in Equation 4 is not solved but an equivalent (more smooth) problem is solved. As used above in the proof of the theorem, an equivalent includes a replacement of a term and moving this term to an opposing side of the inequality.

$$\min_{\underline{x},\underline{x}',\overline{x},\overline{x}'} \frac{\rho}{2}\|\underline{x}-\underline{n}\|^2 + \frac{\overline{\rho}}{2}\|\overline{x}-\overline{n}\|^2 + \frac{\rho'}{2}\|\underline{x}'-\underline{n}'\|^2 + \frac{\overline{\rho}'}{2}\|\overline{x}'-\overline{n}'\|^2 \quad \text{(Equation 15)}$$

$$\text{s.t.} \quad \|\alpha(\underline{x}-\underline{x}') + (1-\alpha)(\overline{x}-\overline{x}')\| - (r+r')^2 \geq 0$$

Initially, it is noted that if the expression $\|\alpha(\underline{n}-\underline{n}')+(1-\alpha)(\overline{n}-\overline{n}')\| > r+r'$ is true, then the constraint is inactive and the minimizer of Equation 15 is $(\underline{n},\underline{n}',\overline{n},\overline{n}')$ with a minimum value of 0. If the expression $\|\alpha(\underline{n}-\underline{n}')+(1-\alpha)(\overline{n}-\overline{n}')\| > r+r'$ is true, the expression $h(\alpha)$ is also true and the minimizer obtained from Equations 6-9 is also $(\underline{n},\underline{n}',\overline{n},\overline{n}')$. Therefore, the proof only requires a showing that Equations 5-9 holds in the case when the constraint is active which corresponds to the case when $\|\alpha(\underline{n}-\underline{n}')+(1-\alpha)(\overline{n}-\overline{n}')\| \leq r+r'$.

To simplify the expressions, several block variables are introduced and expressed in the above problem of Equation 15 to provide a shorter form. Specifically, a first block variable is defined as $x=(\underline{x},\underline{x}',\overline{x},\overline{x}') \in \Re^{4 \times d}$, a second block variable is defined as $n=(\underline{n},\underline{n}',\overline{n},\overline{n}') \in \Re^{4 \times d}$, a third block variable is defined as $\alpha=(\alpha,-\alpha,(1-\alpha),-(1-\alpha)) \in \Re^4$, and a fourth block variable is defined as $D=\text{diag}(\underline{\rho},\underline{\rho}',\overline{\rho},\overline{\rho}') \in \Re^{4 \times 4}$. Accordingly, Equation 15 may be rewritten as the following:

$$\min_{x} \frac{1}{2} tr\{(x-n)^\dagger D(x-n)\} \quad \text{(Equation 16)}$$

$$\text{s.t.} \quad \|\alpha^\dagger x\|^2 - (r+r')^2 \geq 0$$

It is noted that it is necessary that the solutions to the above problem expressed in Equation 16 are among the points that satisfy Karush-Kuhn-Tucker (KKT) conditions. Specifically, these points satisfy:

$$D(x-n)+2\alpha v=0 \quad \text{(Equation 17)}$$

$$v=\lambda(\alpha^\dagger x) \quad \text{(Equation 18)}$$

$$\|v\|/\lambda=r+r' \quad \text{(Equation 19)}$$

where $\lambda \neq 0$ is the Lagrange multiplier associated to the problem's constraint and is non-zero because it is assumed the constraint is active. As will be described in further detail below, the rest of the proof shows that there are only two points that satisfy the KKT conditions and show that, between them, the one that corresponds to the global optimum satisfies Equations 5-9.

The Equations may be written even more compactly with the following:

$$\begin{pmatrix} \frac{1}{2}D & \alpha \\ \alpha^\dagger & -1/\lambda \end{pmatrix} \begin{pmatrix} x \\ v \end{pmatrix} = \begin{pmatrix} \frac{1}{2}Dn \\ 0 \end{pmatrix} \quad \text{(Equation 20)}$$

It may be claimed that, if $1+2\lambda\alpha^\dagger D^{-1}\alpha \neq 0$, the inverse of the block matrix $$\begin{pmatrix} \frac{1}{2}D & \alpha \\ \alpha^\dagger & -1/\lambda \end{pmatrix} \quad \text{(Equation 21)}$$

is $$\begin{pmatrix} 2\left(D^{-1} - \frac{2D^{-1}\lambda\alpha\alpha^\dagger D^{-1}}{1+2\lambda\alpha^\dagger D^{-1}\alpha}\right) & \frac{2\lambda D^{-1}\alpha}{1+2\lambda\alpha^\dagger D^{-1}\alpha} \\ \frac{2\lambda\alpha^\dagger D^{-1}}{1+2\lambda\alpha^\dagger D^{-1}\alpha} & \frac{-\lambda}{1+2\lambda\alpha^\dagger D^{-1}\alpha} \end{pmatrix} \quad \text{(Equation 22)}$$

Although the formula for the inverse of a block matrix may also be used, a simpler manner of the proof is computing the product of Equations 22 and 21 and show it equals the identity. It is evident that the block diagonal entries of the resulting product are indeed identity matrices. Since both matrices are symmetric, the remaining calculation is to verify that one of the non-diagonal block entries is zero. Indeed, such a determination may be illustrated with the following:

$$(\alpha^\dagger)\left(2\left(D^{-1} - \frac{2D^{-1}\lambda\alpha\alpha^\dagger D^{-1}}{1+2\lambda\alpha^\dagger D^{-1}\alpha}\right)\right) + (-1/\lambda)\left(\frac{2\lambda\alpha^\dagger D^{-1}}{1+2\lambda\alpha^\dagger D^{-1}\alpha}\right) =$$

$$\frac{2\alpha^\dagger D^{-1}(1+2\lambda\alpha^\dagger D^{-1}\alpha) - 4\alpha^\dagger D^{-1}\lambda\alpha\alpha^\dagger D^{-1} - 2\alpha^\dagger D^{-1}}{1+2\lambda\alpha^\dagger D^{-1}\alpha} =$$

$$\frac{4\lambda\alpha^\dagger D^{-1}\alpha^\dagger D^{-1}\alpha - 4\alpha^\dagger D^{-1}\lambda\alpha\alpha^\dagger D^{-1}}{1+2\lambda\alpha^\dagger D^{-1}} =$$

$$\frac{(\alpha^\dagger D^{-1}\alpha)(4\lambda\alpha^\dagger D^{-1} - 4\lambda\alpha^\dagger D^{-1})}{1+2\lambda\alpha^\dagger D^{-1}\alpha} = 0$$

The linear system of Equation 20 may be solved by multiplying both sides by the inverse matrix Equation 22 to conclude the following:

$$v = \frac{2\lambda\alpha^\dagger D^{-1}}{1+2\lambda\alpha^\dagger D^{-1}\alpha}\left(\frac{1}{2}Dn\right) = \frac{\lambda\alpha^\dagger n}{1+2\lambda\alpha^\dagger D^{-1}\alpha} \quad \text{(Equation 23)}$$

$$x = 2\left(D^{-1} - \frac{2D^{-1}\lambda\alpha\alpha^\dagger D^{-1}}{1+2\lambda\alpha^\dagger D^{-1}\alpha}\right)\left(\frac{1}{2}Dn\right) = n - \frac{2D^{-1}\lambda\alpha\alpha^\dagger n}{1+2\lambda\alpha^\dagger D^{-1}\alpha} \quad \text{(Equation 24)}$$

Using Equation 24, the objective value of Equation 16 may be expressed with the following:

$$\frac{1}{2}tr\{(x-n)^\dagger D(x-n)\} = \quad \text{(Equation 25)}$$

$$\frac{tr\{n^\dagger \alpha\alpha^\dagger \lambda D^{-1}(-2)D(-2)D^{-1}\lambda\alpha\alpha^\dagger n\}}{2(1+2\lambda\alpha^\dagger D^{-1}\alpha)^2}$$

$$= \frac{tr\{n^\dagger \alpha\alpha^\dagger n\}4\lambda^2(\alpha^\dagger D^{-1}\alpha)}{2(1+2\lambda\alpha^\dagger D^{-1}\alpha)^2} = \quad \text{(Equation 26)}$$

$$\frac{2\lambda^2\|\alpha^\dagger n\|^2(\alpha^\dagger D^{-1}\alpha)}{(1+2\lambda\alpha^\dagger D^{-1}\alpha)^2} = 2\|v\|^2(\alpha^\dagger D^{-1}\alpha)$$

where in the last equality, Equation 23 is made of use. Referring back to the third equation in the KKT conditions, the expression $\|v\|/\lambda=r+r'$ is used and the following may be concluded:

$$\lambda = \frac{1}{2(\alpha^\dagger D^{-1}\alpha)}\left(-1 \pm \frac{\|\alpha^\dagger n\|}{r+r'}\right) \quad \text{(Equation 27)}$$

Therefore, the following may further be concluded:

$$\frac{1}{2}tr\{(x-n)^\dagger D(x-n)\} = \quad \text{(Equation 28)}$$

$$2(r+r')^2 \frac{1}{4(\alpha^\dagger D^{-1}\alpha)^2}\left(-1 \pm \frac{\|a^\dagger n\|}{r+r'}\right)^2 (\alpha^\dagger D^{-1}\alpha)$$

$$= \frac{(r+r' \pm \|\alpha^\dagger n\|)^2}{2(\alpha^\dagger D^{-1}\alpha)} \quad \text{(Equation 29)}$$

Because the global minimum is sought and since there is an assumption that $\|\alpha^\dagger n\| = \|\alpha(\underline{n} - \vec{n}') + (1-\alpha)(\overline{n} - \overline{n}')\| \leq (r+r')$ and the constraint is active, the following may be concluded:

$$\frac{1}{2}tr\{(x^*(\alpha) - n)^\dagger D(x^*(\alpha) - n)\} = \frac{(r+r' - \|\alpha^\dagger n\|)^2}{2(\alpha^\dagger D^{-1}\alpha)} = \frac{1}{2}(h(\alpha))^2 \quad \text{(Equation 30)}$$

This calculation uses the fact that the expressions $\alpha^\dagger n = \alpha \Delta \underline{n} + (1-\alpha \Delta \overline{n})$ and $\alpha^\dagger D^{-1}\alpha = \alpha^2/\rho + (1-\alpha^2)/\overline{\rho}$ hold true. Thus, Equation 5 is proven to be valid when $\|\alpha^\dagger n\| = \|\alpha(\underline{n}-\underline{n}') + (1-\alpha)(\overline{n}-\overline{n}')\| \leq (r+r')$ as long as $1 + 2\lambda\alpha^\dagger D^{-1}\alpha = \|\alpha^\dagger n\|/(r+r') \neq 0$. It is noted that Equation 5 has already been proven to hold when $\|\alpha^\dagger n\| = \|\alpha(\underline{n}-\underline{n}') + (1-\alpha)(\overline{n}-\overline{n}')\| > (r+r')$.

To finish the proof, the validity of Equations 6-9 are proven when the expression $\|\alpha^\dagger n\| = \|\alpha(\underline{n}-\underline{n}') + (1-\alpha)(\overline{n}-\overline{n}')\| > (r+r')$ is true. It is again noted that the validity of Equations 6-9 has already been shown when the expression $\|\alpha^\dagger n\| = \|\alpha(\underline{n}-\underline{n}') + (1-\alpha)(\overline{n}-\overline{n}')\| \leq (r+r')$ is true. In this instance, when the expression $\|\alpha^\dagger n\| = \|\alpha(\underline{n}-\underline{n}') + (1-\alpha)(\overline{n}-\overline{n}')\| > (r+r')$ is true, the following may be written:

$$\lambda = \frac{1}{2(\alpha^\dagger D^{-1}\alpha)}\left(-1 + \frac{\|\alpha^\dagger n\|}{r+r'}\right) = -\frac{h(\alpha)}{2(r+r';)\sqrt{\alpha^\dagger D^{-1}\alpha}} \quad \text{(Equation 31)}$$

If a variable $$\gamma = \frac{2\lambda}{1 + 2\lambda\alpha^\dagger D^{-1}\alpha}$$

is defined in this manner, the following expression for $x^*(\alpha)$ may be written as follows:

$$x^*(\alpha) = n - \gamma D^{-1}\alpha\alpha^\dagger n \quad \text{(Equation 32)}$$

which holds if the expression $\|\alpha^\dagger n\| = \|\alpha(\underline{n}-\underline{n}') + (1-\alpha)(\overline{n}-\overline{n}')\| \neq 0$ is true. One skilled in the art can thereby conclude that this is exactly the same expression as Equations 6-9 to finish the proof.

With the above expressions and the proofs therefore being illustrated, the mechanism used to solve the trajectory optimization problem with the variation of the ADMM and the TWA may be further defined with other collision operators, speeding up computations, and local path planning. Furthermore, as will be described in further detail below, a landmark proximal operator may also be introduced for the mechanism such that the trajectory optimization problem applied to a three-dimensional path of the agents may be determined by the device 100.

With regard to the other collision operators (i.e., non-agent collisions), the wall-agent collision operator may be efficiently extended to path planning of trajectories of agents with obstacles in three-dimensions. To avoid a collision between a first agent having radius r and a line between points $y_1, y_2 \in \Re^d$, the following constraint may be added in the overall optimization problem: $\|\alpha x_1(s) + (1-\alpha)x_1(s+1) - (\beta y_1 + (1-\beta)y_2)\| \geq r$ for all $\alpha, \beta \in [0,1]$ and all $s+1 \in [\eta+1]$. This constraint is associated with the proximal operator that receives $(\underline{n}, \underline{n}')$ and finds $(\underline{x}, \overline{x})$ that minimizes $\rho/2\|\underline{x}-\underline{n}\|^2 + \overline{\rho}/2\|\overline{x}-\overline{n}\|^2$ subject to $\|\alpha\underline{x} + (1-\alpha)\overline{x} - \beta y_1 + (\beta y_1 + (1-\beta)y_2)\| \geq r$ for all $\alpha, \beta \in [0,1]$. Using ideas very similar to those behind the above theorem and the Lemma, the problem may be solved for dimensions strictly greater than two by maximizing over $\alpha, \beta \in [0,1]$ the minimum value the single-constraint version of the problem. In fact, those skilled in the art will recognize that it is easy to generalize the Lemma to $A \cup \Re^k$ and the single-constraint version of this optimization problem may be obtained from Equation 4 by replacing $\underline{n}'$ and $\overline{n}'$ with $\beta y_1 + (1-\beta)y_2$ and letting $\underline{\rho}', \overline{\rho}' \to \infty$. Thus, Equations 5-9 may be used under this replacement and limit to generalize the line-agent collision proximal operator to dimensions greater than two. The same operator may also be used to avoid collisions between agents and a line of thickness $v$ by replacing r with $v+r$.

It is noted that a proximal operator may not be implemented to avoid collisions between an agent and a convex envelop of an arbitrary set of points $y_1, y_2, \ldots, y_q$ by maximizing over $\alpha, \beta_1, \ldots, \beta_{1-q} \in [0,1]$ the minimum of the single-constraint problem obtained from Equation 4 after replacing $\underline{n}'$ and $\overline{n}'$ with $\beta_1 y_1 + \ldots + \beta_{q-2} y_{q-2} + (1 - \beta_1 - \ldots - \beta_{q-1}) y_q$ and letting $\underline{\rho}, \overline{\rho}' \to \infty$. This may only be done when $d > q$, otherwise the condition $\partial_1 g(x^*(\alpha^*)\alpha^*) \neq 0$ of the Lemma does not hold and $x^*(\alpha^*)$ is not feasible for the original SIP problem. Specifically, the max-min approach discussed above cannot directly apply to re-derive the line-agent collision operator for agents in two dimensions but only for dimensions of three or greater. When $d \leq q$, a similar but more complicated principle may be applied to solve the original SIP problem. This may involve considering different portions of the space A separately, computing extermal points instead of maximizing and minimizing and choosing the best feasible solution among these. The exemplary embodiments may be configured to further incorporate such a feature.

With regard to the speeding up of the computations, the computational bottleneck for the collision operators is maximizing Equation 5. There may be two scenarios when avoiding this expensive step to improve performance. A first scenario may be denoted as trivial whereas a second scenario may be denoted as easy.

First, it may be noted that one skilled in the art may readily check whether $x = n$ is a trivial feasible solution. If it is a trivial feasible solution, it must be optimal because it has 0 cost and the operator may return it as the optimal solution. This is the case if the segment from $\Delta\underline{n} = \underline{n} - \underline{n}'$ to $\Delta\overline{n} = \overline{n} - \overline{n}'$ does not intersect the sphere of radius $r+r'$ centered at zero which is equivalent to $\|\alpha\Delta\underline{n} + (1-\alpha)\Delta\overline{n}\| \geq r+r'$ with $\alpha = \max\{1, \min\{0, \alpha'\}\}$ and $\alpha' = \Delta\overline{n}^\dagger(\Delta\overline{n} - \Delta\underline{n})/\|\Delta\overline{n} - \Delta\underline{n}\|^2$.

Second, the easy scenario may be a shortcut to directly determine if the maximizer of $\max_{\alpha \in [0,1]} h(\alpha)$ is either 0 or 1. Initially, h may be noted to have at most one extreme point in [0,1] (e.g., this may be illustrated by plotting $h(\alpha)$ for different values of $\Delta\underline{n}$ and $\Delta\overline{n}$). This being the case, if $\partial_1 h(0) > 0$ and $\partial_1 h(1) > 0$, then $\alpha^* = 1$ and if $\partial_1 h(0) < 0$ and $\partial_1 h(0) < 0$, then $\alpha^* = 0$. Those skilled in the art will understand that evaluating two derivatives of h is much easier than maximizing h and may save computation time such as $\partial_1 h(0) = C(-(r+r') + \|\Delta \overline{n}\| + (\Delta \overline{n}^\dagger - \Delta \overline{n})/\|\Delta \overline{n}\|))$ and $\partial_1 h(1) = C'((r+r') - \|\Delta \underline{n}\| + (\Delta \underline{n}^\dagger (\Delta \underline{n} - \Delta \overline{n})/\|\Delta \underline{n}\|))$ for positive constants C and C'.

It is further noted that if these cases do not hold, the maximizing of Equation 5 may not be avoided which may entail a scenario denoted as expensive.

With regard to local path planning, the optimization problem expressed in Equation 1 finds beginning-to-end collision free paths for all agents simultaneously, known as global path planning. It is also possible to solve path planning greedily by solving a sequence of small optimization problems, known as local path planning. Each of these problems plans the path of all agents for the next τ seconds such that, as a group, they get as close as possible to their final desired positions. These small optimization problems may be solved using a special case of the no-collision operator. Accordingly, the exemplary embodiments extend the local path planning to arbitrary dimensions (particularly to three dimensions) and improve its speed further. As will be described in further detail below, the improvements in speed will be illustrated.

As discussed above, the concept of landmarks may be introduced that, automatically and jointly, (i) produce reference points in space-time that, as a group, agents should try to visit, (ii) produce a good assignment between these reference points and the agents, and (iii) produce collision-free paths for the agents that are trying to visit points assigned to them. Therefore, the exemplary embodiments introduce the landmark proximal operator. The three points are essential, for example, to formation control in multi-robot systems and autonomous surveillance or search and are also related to the problem of assigning tasks to robots if the tasks are seen as groups of points to visit. Prior works focus on only one of these points or treat them in isolation. One application where these points are considered although separately is the problem of using color-changing robots as pixels in a display. The pixel-robots arrangement is planned frame by frame and does not automatically guarantee that the same image part is represented by the same set of robots across frames, crating visual artifacts. In contrast, the exemplary embodiments utilize a landmark formalism that enables a penalty for these situations.

The exemplary embodiments introduce landmarks as extra terms in the objective function expressed in Equation 1. With the above basis, the proximal operators associated with Equation 1 may be determined. For example, a set of landmark trajectories $\{y_j(s)\}_{j \in [m], s_{init} \leq s \leq s_{end}}$ may be considered where, for each trajectory j, a cost $\hat{c}_j > 0$ may be assigned which is the cost of ignoring the entire landmark trajectory. Furthermore, for each landmark $y_j(s) \in \Re^d$, a penalty $c_j(s) > 0$ may be assigned for deviating from $y_j(s)$ assuming the system assigns an agent to the trajectory j. Landmark trajectories extend the objective function of Equation 1 by adding the following term:

$$\sum_{j:\sigma_j \neq *} \sum_{s=s_{init}}^{s_{end}} c_j(s) \|x_{\sigma_j}(s) - y_j(s)\|^2 + \sum_{j:\sigma_j = *} \hat{c}_j \quad \text{(Equation 33)}$$

where the variable $\sigma_j$ indicates which agent should follow trajectory j. If $\sigma_j = *$, that means trajectory j is unassigned. It may be assumed that each trajectory may be assigned to at most one agent which it must follow throughout its duration. Therefore, the agent is $\sigma_j \in [p] \cup \{*\}$ and there exists a condition that if $\sigma_j = \sigma_{j'}$, then either j=j' or $\sigma_j = *$. The overall objective function may be optimized over x and σ. It is noted that it is not equally important to follow every point in the trajectory. For example, by setting some costs equal to zero, it may effectively deal with trajectories of different lengths, different beginnings and ends, and even trajectories with holes. By setting some costs equal to infinity, it may be imposed that if the trajectory is followed, it must be followed exactly. In Equation 33, the Euclidean metric may be used but other distances may be considered (even non-convex ones) as long as the resulting proximal operators are easy to compute. It is also noted that, a priori, the term $\{y_j(s)\}$ is not needed to describe collision free trajectories. The other terms in the overall objective function attempts to enforce no-collision constraints and additional dynamic constraints. It is further noted that if an unreasonable set of path specifications are attempted to be satisfied, the proximal algorithm used may not converge.

The proximal operator associated to the term expressed in Equation 33 receives as an input $\{n_i(s)\}$ and outputs $x_i^*(s)$ where $i \in [p]$, $s_{init} \leq s \leq s_{end}$, and $\{x_i^*(s)\}$ minimizes the following:

$$\min_{x,\sigma} \sum_{j:\sigma_j \neq *} \sum_{s=s_{init}}^{s_{end}} c_j(s) \|x_{\sigma_j}(s) - y_j(s)\|^2 + \sum_{j:\sigma_j = *} \hat{c}_j + \sum_{i=1}^{p} \sum_{s=s_{init}}^{s_{end}} \frac{\rho_i}{2} \|x_i(s) - n_i(s)\|^2 \quad \text{(Equation 34)}$$

The variables σ are used only internally in the computation of the proximal operator because they are not shared with other terms in the overall objective function. The above proximal operator may be efficiently computed with the following process. First, Equation 11 may be optimized over the various x as a function of σ and then the resulting expression may be optimized over the various σ. If optimized over the various x, the term $\Sigma_j w_{j,\sigma_j}$ is obtained where, if $\sigma_j = *$, $w_{l,*} = \hat{c}_j$, and if $\sigma_j = i \neq *$, then the expression $$w_{j,i} = \min_x \sum_{s=s_{init}}^{s_{end}} c_j(s) \|x_i(s) - y_j\|^2 + \frac{\rho_i}{2} \|x_i(s) - n_i(s)\|^2 = \sum_{s=s_{init}}^{s_{end}} \frac{\rho_i c_j(s)}{2 c_j(s) + \rho_i} \|n_i(s) - y_j(s)\|^2$$

holds true. The last equality follows from a solving of a simple quadratic problem. An optimization may be performed over the various σ by solving a linear assignment problem with cost matrix w which may be done, for example, using a simple Hungarian method, or more advanced methods thereof. Once an optimal σ* is determined, the output of the operator may be computed with the following. If i is such that $\{j:\sigma_j^* = i\} = \phi$, then $x_i^*(s) = n_i(s)$ for all $s_{init} \leq s \leq s_{end}$ and if i is such that $i = \sigma_j$ for some $j \in [m]$, then $x_i^*(s) = (\rho_i n_i(s) + 2 c_i(s) y_j(s))/(2 c_i(s) + \rho_i)$ for all $s_{init} \leq s \leq s_{end}$.

The term expressed in Equation 33 corresponds to a set of trajectories between break-points $s = s_{init}$ and $s = s_{end}$ for which the different agents must complete. That is, each agent may follow at most one trajectory. However, an agent may be allowed to be assigned to and cover multiple landmark trajectories. One immediate manner of performing this is by adding more terms of the form expressed in Equation 33 to the overall objective function such that the $k^{th}$ term has all its $m^{(k)}$ in trajectories within the interval $\lfloor s_{init}^{(k)}, s_{end}^{(k)} \rfloor$ and different intervals for different k are disjoint. It is noted that doing this alone does not enable an imposition of a constraint such as the following: "the $j^{th}$ trajectory in the set corresponding to the interval $\lfloor s_{init}^{(k)}, s_{end}^{(k)} \rfloor$ must be covered by the same agent as the $(j')^{th}$ trajectory in the set corresponding to the interval $\lfloor s_{init}^{(k+1)}, s_{end}^{(k+1)} \rfloor$." If such a constraint were to be imposed, an additional constraint is required to be imposed that some of the $\sigma^{(k)}$ variables across different terms of the form expressed in Equation 33 are the same such as (in the previous example) $\sigma_j^{(s)} = \sigma_{j'}^{(s+1)}$. Since the variables may now be shared across different terms, the proximal operator expressed in Equation 34 needs to be changed. Subsequently, this term receives as input a set of values $\{n_i(s)\}_{s,i}$ and $\{n_j'\}_j$ and outputs a set of values $\{x_i^*(s)\}_{i,s}$ and $\{\sigma_j^*\}_j$ that minimize the following:

$$\min_{x,\sigma} \sum_{j:\sigma_j \neq *} \sum_{s=s_{init}}^{s_{end}} c_j(s) \|x_{\sigma_j}(s) - y_j(s)\|^2 +$$

$$\sum_{j:\sigma_j = *} \tilde{c}_j + \sum_{i,s} \frac{\rho_i}{2} \|x_i(s) - n_i(s)\|^2 + \sum_{j=1}^{m} \frac{\rho_j'}{2} \|\sigma_j - n_j'\|^2$$

In the above expression, $\{\sigma_j\}_j$ and $\{n_j'\}_j$ are both vectors of length p+1 where the last component encodes for no assignment and $\sigma_j$ must be binary with only one entry. For example, if p=5 and $\sigma_2=[,0,1,0,0,0]$, the second trajectory in the set of trajectories is assigned to the third agent of the p agents. In another example, if $\sigma_1=[0,0,0,0,0,1]$, the first trajectory in the set of trajectories is not assigned to any agent. The term W may have real values and several non-zero components.

The above problem may also be solved by first optimizing over x and then over σ. By optimizing over x, the term $\Sigma_j \hat{w}_{j,\sigma_j}$ is obtained where $$\tilde{w}_{j,i} = w_{j,i} + \frac{\rho_j'}{2} \|[0, \ldots 0, 1, 0, \ldots, 0] - n_j'\|^2 =$$

$$w_{j,i} + \frac{\rho_j'}{2} \|n_j'\|^2 + \|1 - n_j'^{(i)}\|^2 - \|n_j'^{(i)}\|^2 = w_{j,i} + \frac{\rho_j'}{2} \|n_j'\|^2 + 1 - 2n_j'^{(i)}$$

Given the cost matrix $\hat{w}$, the optimal $\alpha^*$ may be found by solving a linear assignment problem. Given $\alpha^*$, the optimal $x^*$ may be computed using exactly the same expressions as for the problem expressed in Equation 34.

Furthermore, to include constraints of the kind $\sigma_j^{(k)} = \sigma_{j'}^{(k')}$, a term may be added to the objective that takes the value infinity whenever the constraint is violated and zero otherwise. This term is associated with a proximal operator that receives as input $n_j' = (n_j'^{(1)}, \ldots, n_j'^{(m)})$ and $n_{j'}' = (n_{j'}'^{(1)}, \ldots, n_{j'}'^{(m)})$ and outputs $$(\sigma_j^*, \sigma_{j'}^*) \in \mathrm{argmin}_{\sigma_j = \sigma_{j'}} \frac{\rho_j'}{2} \|\sigma_j - n_j'\|^2 + \frac{\rho_{j'}'}{2} \|\sigma_{j'} - n_{j'}'\|^2.$$

Again $\sigma_j$ and $\sigma_{j'}$ are binary vectors of length p+1 with exactly one non-zero entry. The solution has the form $\sigma_j^* = \sigma_{j'}^* = [0,0,\ldots,0,1,0\ldots 0]$ where the 1 is in position $i^* = \arg\max_{i \in [p]} \rho_j' n_j'^{(i)} + \rho_{j'}' n_{j'}'^{(i)}$.

Figure 4:
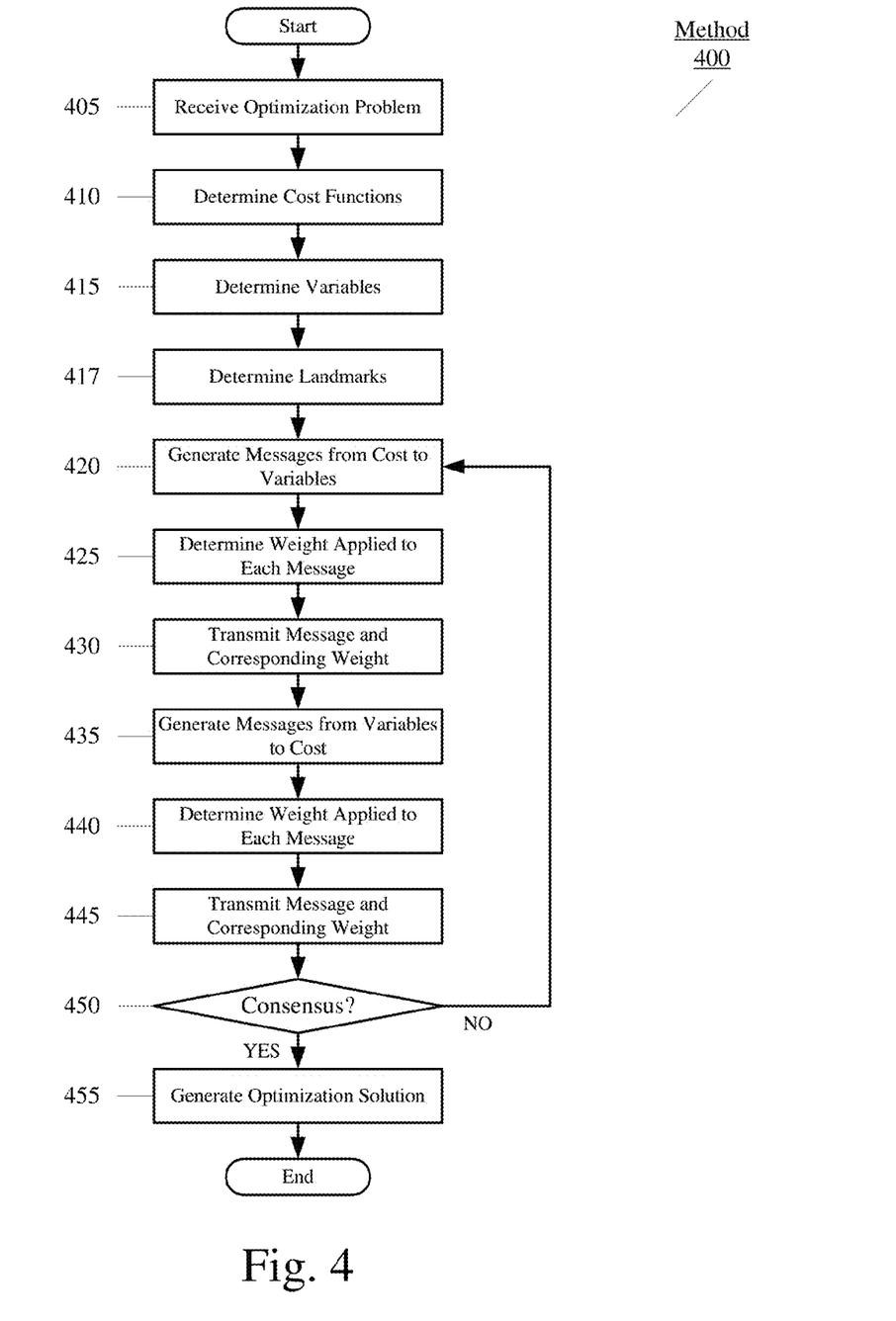
FIG. 4 shows a method of generating an optimization solution according to an exemplary embodiment.

FIG. 4 shows a method 400 of generating an optimization solution according to an exemplary embodiment. In step 405, the device 100 receives the optimization problem. For example, via the I/O device 120, a user may provide the optimization problem. Specifically, the optimization problem may correspond to a trajectory optimization problem in which agents are allowed to have path planning in two or more dimensions, in particular three-dimensions. Within the optimization problem are a plurality of cost functions and a plurality of variables or constraints. Thus, in step 410 and 415, the device 100 (via the variable engine 125 and the cost engine 130) determine the cost functions and the variables of the optimization problem. It should be noted that the user may simply provide the cost functions and the variables. Thus, the device 100 may receive the cost functions and the variables.

It should be noted that the device 100 may utilize a factor graph such as the graphical models 200, 300. Thus, the method 400 may include steps that generate these factor graphs. For example, the factor graph engine 135 may generate the graphical models via the constraint engine 140 providing data as to the relationships between the cost functions and the variables. Specifically, the relationships may be those shown in the graphical models 200, 300 for the nodes on the left and the nodes on the right.

In step 417, the device 100 (via the landmark engine 132) determines the landmarks that are introduced to the optimization problem. As discussed above, the landmark may provide a point or set of points that the agent should attempt to visit along its path from an initial position to a final position. Thus, when a path is determined for the agent that deviates from visiting the landmark, the associated cost may be affected for this path.

In step 420, the device 100 generates messages to be passed from the cost functions to the variables (e.g., the messages to be passed from the left nodes to the right nodes on the factor graph). In step 425, the device 100 also determine a respective weight to be applied to each message. As discussed above, the exemplary optimization algorithm utilizes a TWA. Accordingly, each message that is generated also includes a corresponding weight (e.g., zero, infinite, and standard). In step 430, the message and corresponding weight are transmitted from the cost functions to the variables. These steps may further incorporate the landmarks described above. Specifically, the cost functions may be affected directly by whether the agent visits the landmark or not.

In step 435, based upon the messages and weights that were received from the cost functions to the variables, the device 100 generates further messages to be passed from the variables to the cost functions. In step 440, the device 100 determines a respective weight to be applied to each of these further messages. In step 445, the further message and corresponding weight are transmitted from the variables to the cost functions.

In step 450, the device 100 determines whether there is a consensus between the messages being transmitted between the cost functions and the variables. If a consensus has not been reached, the method 400 returns to step 420 where steps 420-445 are repeated. This may repeat as many times as required for the consensus to be reached. Once the consensus is reached, the method 400 continues to step 455. In step 455, the optimization solution is generated as a function of the messages transmitted that were determined to form the consensus. That is, the optimization solution relates to a minimum being reached for each of the cost functions while still satisfying all the requirements of the variables.

It should be noted that the method 400 may include further steps. For example, the method 400 may include a criterion in which the consensus is only formed when a predetermined number of consecutive messages that are passed between the cost functions and the variables holds true. Thus, after step 450, the method 400 may include a further determination such that the satisfaction of the predetermined number is determined. In another example, the method 400 may include steps after step 425 and step 440 in which a determination is made whether nodes or input/outputs to the nodes may be ignored or removed from further computation. For example, when a zero weight or infinite weight is determined for a particular message, the graphical model may be modified to incorporate this knowledge to further improve efficiency in determining the optimization solution.

The above method 400 of FIG. 4 may be executed using the proximal operators described above to determine the solution for the optimization problem. Accordingly, numerical experiments may be performed to determine an efficiency with which the exemplary embodiments provide the intended functionality. The numerical experiments are described herein with a first iteration of the variant on the ADMM (utilizing different proximal operators or blocks) using the TWA that applied to only two-dimensional scenarios (hereinafter "Old") versus a second iteration according to the exemplary embodiments (hereinafter "New").

The numerical experiments have been such that the first run using the Old iteration is performed on a configuration where 8 agents each having a radius r=0.918 equally spaced around a circle of radius R=3 where each agent is required to exchange position with the corresponding antipodal agent. While running the TWA using the Old iteration, the trace of all n variables input into the Old operators. The execution speed of the Old iteration versus the New iteration have been compared on this trace of inputs, after segmenting the n variables into trivial, easy, or expensive. For global planning, the distribution of trivial, easy, and expensive inputs resulted in {0.814, 0.001, 0.185}. Although the expensive inputs are infrequent, the total wall-clock time that the New iteration takes to process them is 76 msec compared to 54 msec to process all trivial and easy inputs. By comparison, the Old iteration takes a total time of 551 msec on the expensive inputs, thereby the New iteration yielding an average speedup of 7.25× on the inputs that are most expensive to process. Similarly, the trace of the n variables input into the collision operator are collected when using the local planning method on this same scenario. It is observed a distribution of the trivial, easy, and expensive inputs equal to {0.597, 0.121, 0.282} where a total time spent in the easy and trivial cases of 340 msec for the New iteration and a total time spent in the expensive cases of 2,802 msec for the New iteration and 24,157 msec for the Old iteration. This results in an average speedup of 8.62× on the expensive inputs. For other scenarios, a similar speedup is observed on the expensive inputs, although scenarios easier than the currently used configuration have fewer expensive inputs. For example, if the initial and final target points are chosen at random instead of with antipodal targets, the distribution results in {0.968, 0, 0.032}.

Figure 5A:
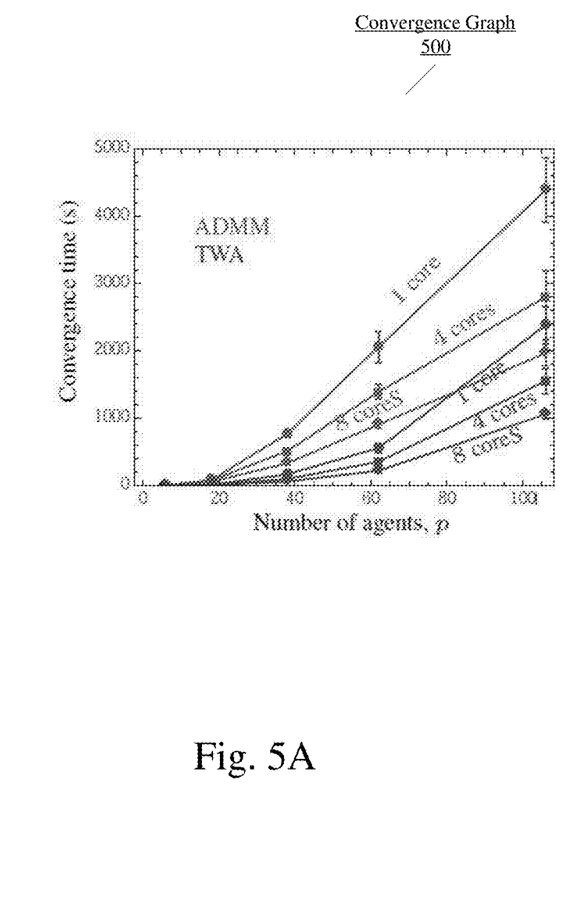
FIG. 5A shows a convergence graph from using the method of FIG. 4.
Figure 5B:
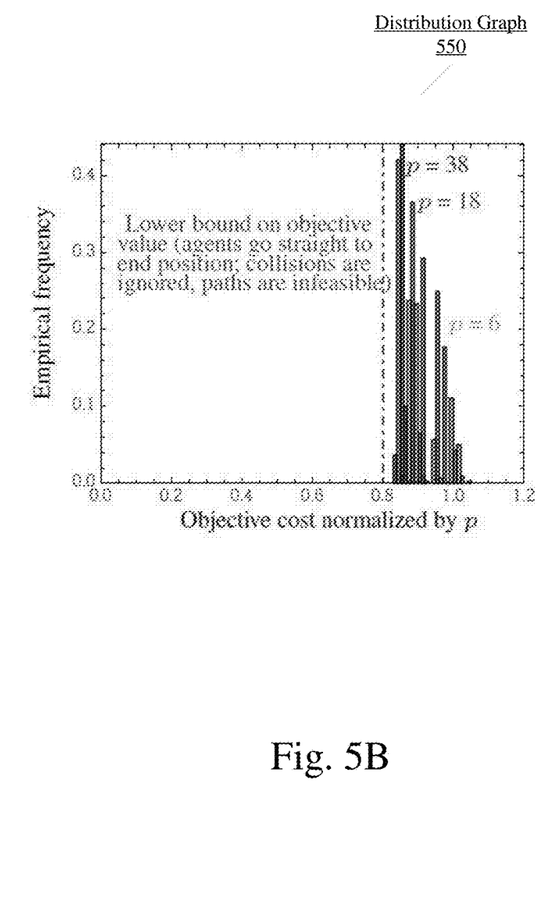
FIG. 5B shows a distribution graph from using the method of FIG. 4.

FIG. 5A shows a convergence graph 500 from using the method 400 of FIG. 4. The convergence graph 500 shows the convergence time for instances of the above described configuration in three-dimensions using the New iteration for a different number of agents using both the variant of the ADMM and the TWA. It is again noted that the Old iteration cannot be applied to agents having paths in three-dimensions. The results indicate that the convergence time appears to grow polynomially with p, the TWA is faster than the ADMM, and the proximal operators lend themselves to parallelism, and thus added processing cores decrease time. FIG. 5B shows a distribution graph 550 from using the method 400 of FIG. 4. The distribution graph 550 shows that the paths found when the TWA solves the configuration in three-dimensions over 1,000 random initializations are not very different and seem to remain good in terms of objective value.

The exemplary embodiments provide a method and device for generating an optimization solution for an optimization problem. Specifically, the optimization solution is a modified version of the ADMM algorithm in which the messages in the message-passing algorithm includes various weights. The weights may indicate a "certainty," a "no opinion," or otherwise a "standard." Through incorporating the weights, the optimization solution may be determined in a more efficient manner. The optimization solution may also be modified through incorporation of knowledge that is determined during the course of the message-passing. Whether a reasoner hierarchy or graph dynamics are used, the knowledge may further improve the efficiency at which the optimization solution is determined. The exemplary embodiments further utilize specialized proximal operators for agent-agent collisions, non-agent collisions, and landmarks. Accordingly, the optimization solution determines straightest possible paths for the agents that move from a first configuration to a second configuration in a tight formation.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   (a) receiving an optimization problem, the optimization problem including a plurality of cost functions and a plurality of variables, the cost functions representing possible costs for values of the variables in the optimization problem, each of the cost functions having a predetermined relationship with select ones of the variables, wherein the optimization problem comprises a trajectory planning problem in which a plurality of agents are to move from a first configuration to a second configuration;
   (b) receiving at least one landmark, each landmark indicating at least one point that a selected one of the agents is to visit while moving from the first configuration to the second configuration, a further possible cost for the values of the variables in the optimization problem being generated when the selected agent ignores the landmark;

(c) generating a first message for each of the cost functions for each corresponding variable based upon the respective predetermined relationship, the first message indicating a first belief that the corresponding variable has a first value when the optimization problem is solved, the first message having a respective first weight indicating a certainty of the first message;

(d) generating a second message for each of the variables for each corresponding cost function based upon the respective predetermined relationship, the second message indicating a second belief that the corresponding variable has a second value when the optimization problem is solved, the second message having a respective second weight indicating a certainty of the second message;

(e) generating a disagreement variable for each corresponding pair of variables and cost functions measuring a disagreement value between the first and second beliefs;

(f) repeating steps (c), (d), and (e) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable; and (g) determining an optimization solution based upon the consensus, wherein the optimization solution comprises a solution to the trajectory planning problem.

2. The method of claim 1, wherein the optimization problem includes the agents moving in a space including at least two dimensions.

3. The method of claim 1, wherein the further possible cost is greater than zero.

4. The method of claim 1, wherein the landmark is a sub-trajectory.

5. The method of claim 4, further comprising:
generating an additional cost for the values of the variables in the optimization problem being generated when the selected agent deviates from the landmark.

6. The method of claim 1, wherein the optimization solution jointly incorporates the landmark, an assignment between the landmark and the agents, and collision-free paths for the agents that are to visit the landmark.

7. The method of claim 1, wherein the first messages for the cost functions are computed in parallel to determine the optimization solution.

8. The method of claim 1, wherein each of the first and second weights is one of a zero weight, an infinite weight, and a standard weight, the zero weight indicates that the corresponding message is not to be used in determining the optimization solution, the infinite weight indicates that the corresponding message specifies an unchangeable value for a variable in determining the optimization solution, and the standard weight is given a predetermined value between zero and infinity.

9. The method of claim 1, wherein the optimization problem is one of convex and non-convex.

10. A device, comprising:
a processor coupled to a memory, wherein the processor is programmed to determine an optimization solution to an optimization problem by:

(a) receiving the optimization problem, the optimization problem including a plurality of cost functions and a plurality of variables, the cost functions representing possible costs for values of the variables in the optimization problem, each of the cost functions having a predetermined relationship with select ones of the variables, wherein the optimization problem comprises a trajectory planning problem in which a plurality of agents are to move from a first configuration to a second configuration;

(b) receiving at least one landmark, each landmark indicating at least one point that a selected one of the agents is to visit while moving from the first configuration to the second configuration, a further possible cost for the values of the variables in the optimization problem being generated when the selected agent ignores the landmark;

(c) generating a first message for each of the cost functions for each corresponding variable based upon the respective predetermined relationship, the first message indicating a first belief that the corresponding variable has a first value when the optimization problem is solved, the first message having a respective first weight indicating a certainty of the first message;

(d) generating a second message for each of the variables for each corresponding cost function based upon the respective predetermined relationship, the second message indicating a second belief that the corresponding variable has a second value when the optimization problem is solved, the second message having a respective second weight indicating a certainty of the second message;

(e) generating a disagreement variable for each corresponding pair of variables and cost functions measuring a disagreement value between the first and second beliefs;

(f) repeating steps (c), (d), and (e) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable; and (g) determining the optimization solution based upon the consensus, wherein the optimization solution comprises a solution to the trajectory planning problem.

11. The device of claim 10, wherein the optimization problem includes the agents moving in a space including at least two dimensions.

12. The device of claim 10, wherein the further possible cost is greater than zero.

13. The device of claim 10, wherein the landmark is a sub-trajectory.

14. The device of claim 13, wherein the processor further generates an additional cost for the values of the variables in the optimization problem being generated when the selected agent deviates from the landmark.

15. The device of claim 10, wherein the optimization solution jointly incorporates the landmark, an assignment between the landmark and the agents, and collision-free paths for the agents that are to visit the landmark.

16. The device of claim 10, wherein the first messages for the cost functions are computed in parallel to determine the optimization solution.

17. The device of claim 10, wherein each of the first and second weights is one of a zero weight, an infinite weight, and a standard weight, the zero weight indicates that the corresponding message is not to be used in determining the optimization solution, the infinite weight indicates that the corresponding message specifies an unchangeable value for a variable in determining the optimization solution, and the standard weight is given a predetermined value between zero and infinity.

18. A non-transitory computer readable storage medium with an executable program stored thereon, wherein the program instructs a microprocessor to perform operations comprising:
  (a) receiving an optimization problem, the optimization problem including a plurality of cost functions and a plurality of variables, the cost functions representing possible costs for values of the variables in the optimization problem, each of the cost functions having a predetermined relationship with select ones of the variables, wherein the optimization problem comprises a trajectory planning problem in which a plurality of agents are to move from a first configuration to a second configuration:
  (b) receiving at least one landmark, each landmark indicating at least one point that a selected one of the agents is to visit while moving from the first configuration to the second configuration, a further possible cost for the values of the variables in the optimization problem being generated when the selected agent ignores the landmark;
  (c) generating a first message for each of the cost functions for each corresponding variable based upon the respective predetermined relationship, the first message indicating a first belief that the corresponding variable has a first value when the optimization problem is solved, the first message having a respective first weight indicating a certainty of the first message;
  (d) generating a second message for each of the variables for each corresponding cost function based upon the respective predetermined relationship, the second message indicating a second belief that the corresponding variable has a second value when the optimization problem is solved, the second message having a respective second weight indicating a certainty of the second message;
  (e) generating a disagreement variable for each corresponding pair of variables and cost functions measuring a disagreement value between the first and second beliefs;
  (f) repeating steps (c), (d), and (e) until a consensus is formed between the first and second messages, a subsequent first message being modified based upon the second message, its corresponding second weight, and the corresponding disagreement variable, and a subsequent second message being modified based upon the first message, its corresponding first weight, and the corresponding disagreement variable; and
  (g) determining an optimization solution based upon the consensus, wherein the optimization solution comprises a solution to the trajectory planning problem.

* * * * *